United States Patent
Geiger

(10) Patent No.: US 12,460,749 B2
(45) Date of Patent: Nov. 4, 2025

(54) CRADLE MOUNT FIXINGS

(71) Applicant: HellermannTyton Corporation, Milwaukee, WI (US)

(72) Inventor: Gerard G. Geiger, Jackson, WI (US)

(73) Assignee: HellermannTyton Corporation, Milwaukee, WI (US)

(*) Notice: Subject to any disclaimer, the term of this patent is extended or adjusted under 35 U.S.C. 154(b) by 0 days.

(21) Appl. No.: 18/648,072

(22) Filed: Apr. 26, 2024

(65) Prior Publication Data

US 2024/0360923 A1   Oct. 31, 2024

Related U.S. Application Data

(60) Provisional application No. 63/591,911, filed on Oct. 20, 2023, provisional application No. 63/499,109, filed on Apr. 28, 2023.

(51) Int. Cl.
*F16L 3/137* (2006.01)
(52) U.S. Cl.
CPC .................................. *F16L 3/137* (2013.01)
(58) Field of Classification Search
CPC ...................................................... F16L 3/137
USPC ........................ 248/74.3, 505, 680, 671, 69
See application file for complete search history.

(56) References Cited

U.S. PATENT DOCUMENTS

| | | |
|---|---|---|
| 639,169 A | 12/1899 | Goff et al. |
| 1,308,869 A | 7/1919 | Rohmer |
| 1,313,372 A | 8/1919 | Doge |
| 1,365,626 A | 1/1921 | Pleister et al. |
| 1,437,144 A | 11/1922 | Isaacson |

(Continued)

FOREIGN PATENT DOCUMENTS

| | | |
|---|---|---|
| AU | 2008207548 | 3/2010 |
| CA | 2956930 | 3/2018 |

(Continued)

OTHER PUBLICATIONS

"24Pcs PC Cable Comb Clamp Organizer 6Pin 8Pin 24Pin Computer Management Clamp Clip Power Cables Wiring Connector for 3.0-3.6mm", Retrieved at: https://www.aliexpress.com/i/3256804212723982.html?gatewayAdapt=4itemAdapt—on May 18, 2024, 5 pages.

(Continued)

*Primary Examiner* — Anita M King
(74) *Attorney, Agent, or Firm* — Colby Nipper PLLC

(57) ABSTRACT

A cradle mount fixing that includes a cradle section, a mounting section, and a cable tie portion. The cradle section defines a channel that is configured for receiving a component. The cradle section includes a body section, a first cradle portion, and a second cradle portion. The first and second cradle portions define first and second cradles. The first and/or second cradle portions include cradle arms that may define inwardly extending retainer tabs that are configured for retaining the component in the first and/or second cradles. The mounting section is configured for attachment to a workpiece to secure the fixing to the workpiece. The mounting section connects to the cradle section. The cable tie portion may be integrally formed with the cradle section. The cable tie portion is configured to wrap around and secure the component to the body section.

20 Claims, 5 Drawing Sheets

(56) References Cited

U.S. PATENT DOCUMENTS

| | | | |
|---|---|---|---|
| 1,711,730 | A * | 5/1929 | Gibson .................. A47G 29/08 248/113 |
| 2,193,291 | A | 3/1940 | Marchins |
| 2,884,214 | A | 4/1959 | Wrobel |
| 2,945,713 | A | 7/1960 | Sears |
| 2,969,216 | A | 1/1961 | Hallsey |
| 3,149,808 | A | 9/1964 | Weckesser |
| 3,188,030 | A | 6/1965 | Arthur |
| 3,250,505 | A | 5/1966 | Rodman et al. |
| 3,252,677 | A | 5/1966 | Raymond |
| 3,385,050 | A | 5/1968 | Hall |
| 3,463,427 | A | 8/1969 | Fisher |
| 3,483,787 | A | 12/1969 | Saunders |
| 3,486,725 | A | 12/1969 | Hidassy |
| 3,504,937 | A | 4/1970 | Panovic |
| 3,581,349 | A | 6/1971 | Verspieren |
| 3,605,199 | A | 9/1971 | Eberhardt |
| 3,632,069 | A | 1/1972 | Thayer et al. |
| 3,632,070 | A | 1/1972 | Thayer et al. |
| 3,632,071 | A | 1/1972 | Cameron et al. |
| 3,705,708 | A | 12/1972 | Cunningham |
| 3,737,128 | A | 6/1973 | Schuplin |
| 3,810,279 | A | 5/1974 | Swick et al. |
| 3,906,146 | A | 9/1975 | Taylor |
| 3,913,876 | A | 10/1975 | McSherry |
| 3,921,496 | A | 11/1975 | Helderman |
| 4,009,509 | A | 3/1977 | Mccormick |
| 4,037,978 | A | 7/1977 | Connelly |
| 4,128,220 | A | 12/1978 | McNeel |
| 4,141,116 | A | 2/1979 | Zalonis |
| 4,185,800 | A | 1/1980 | Kabel |
| 4,264,047 | A | 4/1981 | Nelson et al. |
| 4,269,379 | A | 5/1981 | Mccormick |
| 4,318,518 | A | 3/1982 | Davis |
| 4,386,752 | A | 6/1983 | Pavlak et al. |
| 4,396,329 | A | 8/1983 | Wollar |
| 4,402,641 | A | 9/1983 | Artf |
| 4,427,328 | A | 1/1984 | Kojima |
| 4,445,255 | A | 5/1984 | Olejak |
| 4,472,918 | A | 9/1984 | Mach |
| 4,490,886 | A | 1/1985 | Omata |
| 4,509,710 | A | 4/1985 | Cooper et al. |
| 4,517,710 | A | 5/1985 | Beckmann |
| 4,552,481 | A | 11/1985 | Bluett |
| 4,582,281 | A | 4/1986 | Van |
| 4,607,414 | A | 8/1986 | Six |
| 4,609,171 | A | 9/1986 | Matsui |
| 4,652,192 | A | 3/1987 | Schaller |
| 4,665,588 | A | 5/1987 | Nakano |
| 4,688,961 | A | 8/1987 | Shioda et al. |
| 4,705,245 | A | 11/1987 | Osada |
| 4,705,442 | A | 11/1987 | Fucci |
| 4,728,238 | A | 3/1988 | Chisholm et al. |
| 4,766,651 | A | 8/1988 | Kobayashi |
| 4,768,741 | A | 9/1988 | Logson |
| 4,779,828 | A | 10/1988 | Munch |
| 4,783,029 | A | 11/1988 | Geppert et al. |
| 4,817,901 | A | 4/1989 | Kuo et al. |
| 4,840,023 | A | 6/1989 | Borsani |
| 4,845,316 | A | 7/1989 | Kaercher |
| 4,865,281 | A | 9/1989 | Wollar |
| 4,875,647 | A | 10/1989 | Takagi et al. |
| 4,878,791 | A | 11/1989 | Kurihara et al. |
| 4,900,210 | A | 2/1990 | Buchanan |
| 4,902,182 | A | 2/1990 | Lewis |
| 4,910,831 | A | 3/1990 | Bingold |
| 4,919,373 | A | 4/1990 | Caveney et al. |
| 4,920,618 | A | 5/1990 | Iguchi |
| 4,925,136 | A | 5/1990 | Knott |
| 4,936,530 | A | 6/1990 | Wollar |
| 4,938,645 | A | 7/1990 | Wollar |
| 4,944,475 | A | 7/1990 | Ono et al. |
| 4,955,749 | A | 9/1990 | Panovic |
| 4,976,578 | A | 12/1990 | Mathes et al. |
| 4,993,669 | A | 2/1991 | Dyer |
| 4,993,903 | A | 2/1991 | Kraus |
| 5,039,267 | A | 8/1991 | Wollar |
| 5,040,752 | A | 8/1991 | Morrison |
| D323,106 | S | 1/1992 | Daigle et al. |
| 5,088,158 | A | 2/1992 | Burkholder et al. |
| 5,102,075 | A | 4/1992 | Dyer |
| 5,131,613 | A | 7/1992 | Kamiya et al. |
| 5,216,206 | A | 6/1993 | Maesako |
| 5,221,065 | A | 6/1993 | Siems et al. |
| 5,224,244 | A | 7/1993 | Ikeda et al. |
| 5,288,189 | A | 2/1994 | Hepworth |
| 5,301,917 | A | 4/1994 | Dyer |
| 5,305,978 | A | 4/1994 | Current |
| 5,306,098 | A | 4/1994 | Lewis |
| D347,156 | S | 5/1994 | Starrett et al. |
| 5,324,151 | A | 6/1994 | Szudarek et al. |
| 5,328,290 | A | 7/1994 | Plastina |
| 5,332,179 | A | 7/1994 | Kuffel et al. |
| 5,333,822 | A | 8/1994 | Benoit et al. |
| 5,337,983 | A | 8/1994 | Mailey |
| 5,344,112 | A | 9/1994 | Peterson et al. |
| 5,354,021 | A | 10/1994 | Farrell |
| 5,367,750 | A | 11/1994 | Ward et al. |
| 5,368,261 | A | 11/1994 | Caveney et al. |
| 5,385,321 | A | 1/1995 | Kume et al. |
| 5,386,615 | A | 2/1995 | Bernard |
| 5,390,876 | A | 2/1995 | Hatano et al. |
| 5,393,185 | A | 2/1995 | Duffy |
| 5,398,383 | A | 3/1995 | Bingold |
| 5,468,108 | A | 11/1995 | Sullivan et al. |
| 5,494,245 | A | 2/1996 | Suzuki et al. |
| 5,538,208 | A | 7/1996 | Cordes et al. |
| D372,665 | S | 8/1996 | Kim |
| 5,601,261 | A | 2/1997 | Koike |
| 5,636,937 | A | 6/1997 | Zemlicka |
| 5,642,612 | A | 7/1997 | Hughes |
| 5,653,409 | A | 8/1997 | White et al. |
| 5,664,754 | A | 9/1997 | Gaenslen |
| 5,669,731 | A | 9/1997 | Hironaka et al. |
| 5,704,573 | A | 1/1998 | de Beers et al. |
| 5,718,025 | A | 2/1998 | Courtin |
| 5,730,399 | A | 3/1998 | Baginski |
| 5,732,446 | A | 3/1998 | Blanks |
| 5,765,787 | A | 6/1998 | de Beers et al. |
| 5,772,258 | A | 6/1998 | Dyer et al. |
| 5,774,944 | A | 7/1998 | Choi |
| 5,806,812 | A | 9/1998 | Jacobs et al. |
| 5,813,810 | A | 9/1998 | Izume |
| 5,820,048 | A | 10/1998 | Shereyk et al. |
| 5,820,083 | A | 10/1998 | Geiger |
| 5,824,957 | A | 10/1998 | Holshausen |
| 5,832,567 | A | 11/1998 | Edwards et al. |
| 5,862,927 | A | 1/1999 | Tebeau |
| 5,884,367 | A | 3/1999 | Teagno et al. |
| 5,890,265 | A | 4/1999 | Christian et al. |
| 5,896,720 | A * | 4/1999 | Bond .................. E04G 21/3261 24/339 |
| 5,900,586 | A | 5/1999 | Carr |
| 5,907,891 | A | 6/1999 | Meyer |
| 5,921,510 | A | 7/1999 | Benoit et al. |
| 5,926,921 | A | 7/1999 | Benoit |
| 5,937,488 | A | 8/1999 | Geiger |
| 5,941,483 | A | 8/1999 | Baginski |
| 5,961,081 | A | 10/1999 | Rinderer |
| 5,966,781 | A | 10/1999 | Geiger |
| D417,142 | S | 11/1999 | Kim |
| 5,988,570 | A | 11/1999 | Gretz |
| D417,387 | S | 12/1999 | Kim |
| D417,838 | S | 12/1999 | Kim |
| 6,003,208 | A | 12/1999 | Christian et al. |
| D424,922 | S | 5/2000 | Sherman et al. |
| 6,105,908 | A | 8/2000 | Kraus |
| 6,151,761 | A | 11/2000 | Thompson |
| 6,196,033 | B1 | 3/2001 | Dowdle |
| 6,196,751 | B1 | 3/2001 | Khokhar |
| 6,203,240 | B1 | 3/2001 | Hironaka et al. |
| 6,240,602 | B1 | 6/2001 | Geiger |
| 6,253,421 | B1 | 7/2001 | Kraus |
| 6,320,134 | B1 | 11/2001 | Rehberg et al. |

(56) References Cited

U.S. PATENT DOCUMENTS

| | | |
|---|---|---|
| 6,364,257 B1 | 4/2002 | Holder |
| 6,367,211 B1 | 4/2002 | Weener et al. |
| 6,398,169 B1 | 6/2002 | Streit |
| 6,443,403 B1 | 9/2002 | Page et al. |
| 6,532,631 B2 | 3/2003 | Rohaly et al. |
| 6,533,226 B2 | 3/2003 | Geiger |
| 6,536,718 B2 | 3/2003 | Benito-Navazo |
| 6,550,723 B2 | 4/2003 | Fraley et al. |
| 6,560,822 B2 | 5/2003 | Caveney et al. |
| 6,592,083 B1 | 7/2003 | Hobson et al. |
| 6,634,063 B2 | 10/2003 | Joseph |
| 6,655,644 B1 | 12/2003 | Gretz |
| 6,669,149 B2 | 12/2003 | Akizuki |
| 6,669,150 B2 | 12/2003 | Benoit |
| 6,669,426 B1 | 12/2003 | Detter et al. |
| 6,718,597 B2 | 4/2004 | Geiger |
| 6,719,513 B1 | 4/2004 | Moutousis et al. |
| 6,725,642 B2 | 4/2004 | Tsutsumi et al. |
| 6,732,982 B1 | 5/2004 | Messinger |
| 6,745,439 B2 | 6/2004 | Browniee et al. |
| 6,749,157 B2 | 6/2004 | Takeuchi |
| 6,807,714 B2 | 10/2004 | O'Young et al. |
| 6,809,257 B2 | 10/2004 | Shibuya |
| 6,923,407 B2 | 8/2005 | Takeuchi |
| 6,991,102 B2 | 1/2006 | Kurmis |
| 7,036,338 B2 | 5/2006 | Hofer et al. |
| 7,055,783 B2 | 6/2006 | Rosemann et al. |
| 7,114,686 B2 | 10/2006 | Andrigo |
| 7,114,687 B2 | 10/2006 | Swantner et al. |
| 7,131,168 B2 | 11/2006 | Pangallo |
| 7,186,068 B2 | 3/2007 | Zoubek et al. |
| 7,222,925 B2 | 5/2007 | Yu et al. |
| D543,835 S | 6/2007 | Geiger |
| 7,240,477 B1 | 7/2007 | Dunfee et al. |
| 7,240,880 B2* | 7/2007 | Benoit ............... F16L 3/223 248/65 |
| 7,278,188 B2 | 10/2007 | Kurmis |
| 7,375,282 B2 | 5/2008 | James |
| D570,673 S | 6/2008 | Geiger et al. |
| 7,407,138 B1 | 8/2008 | Gretz |
| 7,437,804 B1 | 10/2008 | Geiger et al. |
| 7,448,579 B2 | 11/2008 | Kwilosz |
| 7,484,351 B2 | 2/2009 | Harada et al. |
| 7,503,528 B2 | 3/2009 | Adams et al. |
| 7,510,361 B2 | 3/2009 | Mostazo-oviedo |
| 7,520,476 B2 | 4/2009 | Caveney et al. |
| 7,594,629 B2 | 9/2009 | Smutny et al. |
| 7,600,724 B2 | 10/2009 | Nelson et al. |
| 7,614,836 B2 | 11/2009 | Mohiuddin et al. |
| 7,621,487 B2 | 11/2009 | Brown et al. |
| 7,621,488 B2 | 11/2009 | Miller |
| 7,640,707 B2 | 1/2010 | Johnson et al. |
| 7,661,631 B2 | 2/2010 | Ibaraki |
| 7,661,632 B2 | 2/2010 | Caveney et al. |
| 7,661,633 B2 | 2/2010 | Igarashi et al. |
| 7,753,320 B2 | 7/2010 | Geiger et al. |
| 7,753,321 B2 | 7/2010 | Geiger |
| 7,757,997 B2 | 7/2010 | Smutny et al. |
| 7,780,122 B1 | 8/2010 | Herbers |
| 7,793,895 B2 | 9/2010 | Franks |
| 7,861,981 B2* | 1/2011 | Olver ............... H02G 3/32 248/65 |
| 7,862,272 B2 | 1/2011 | Nakajima |
| D631,739 S | 2/2011 | Craig et al. |
| 7,887,012 B2 | 2/2011 | Desai et al. |
| 7,891,926 B2 | 2/2011 | Jakson |
| 7,896,601 B2 | 3/2011 | Kalyanadurga et al. |
| 8,020,812 B2 | 9/2011 | Matsuno et al. |
| 8,025,258 B2 | 9/2011 | Eldridge |
| 8,028,962 B2 | 10/2011 | Geiger |
| 8,177,173 B2 | 5/2012 | Spiess |
| 8,221,042 B2 | 7/2012 | Vitali |
| 8,240,343 B2 | 8/2012 | Dyer et al. |
| 8,281,461 B2 | 10/2012 | Geiger |
| 8,282,047 B2 | 10/2012 | Franks |
| 8,286,924 B2 | 10/2012 | Sano et al. |
| 8,313,064 B2 | 11/2012 | Stocker |
| 8,328,457 B2 | 12/2012 | Werth |
| 8,333,514 B2 | 12/2012 | Weimer |
| 8,413,416 B2 | 4/2013 | Egami |
| 8,533,919 B2 | 9/2013 | Schliessner |
| 8,534,624 B2 | 9/2013 | Juenemann et al. |
| 8,601,649 B2 | 12/2013 | Klein et al. |
| 8,607,541 B1 | 12/2013 | Cavuoti |
| 8,622,481 B2 | 1/2014 | Niederriter et al. |
| 8,708,289 B2 | 4/2014 | Allenbach et al. |
| 8,833,706 B2 | 9/2014 | Elsmore et al. |
| 8,870,135 B2 | 10/2014 | Grubbs |
| 8,967,556 B2 | 3/2015 | Meyers et al. |
| 8,979,039 B2 | 3/2015 | Shiga |
| 8,991,774 B2 | 3/2015 | Hajduch |
| 9,004,417 B2 | 4/2015 | Elsner et al. |
| D734,654 S | 7/2015 | Geiger et al. |
| 9,188,247 B2 | 11/2015 | Pauchet et al. |
| 9,212,677 B2 | 12/2015 | Owen |
| D760,067 S | 6/2016 | Geiger |
| 9,633,763 B2* | 4/2017 | Murao .............. F16L 3/233 |
| 9,653,901 B2 | 5/2017 | Miyamoto et al. |
| 9,667,045 B2 | 5/2017 | Kitamura et al. |
| 9,718,591 B2 | 8/2017 | Lu et al. |
| 9,809,179 B2 | 11/2017 | Inoue et al. |
| D804,942 S | 12/2017 | Toll et al. |
| 9,899,822 B2 | 2/2018 | Richardson et al. |
| 9,972,984 B1 | 5/2018 | Tisbo |
| D824,622 S | 7/2018 | Toll et al. |
| 10,018,249 B2 | 7/2018 | Komiya |
| 10,036,487 B2 | 7/2018 | Duggan |
| D829,090 S | 9/2018 | Toll et al. |
| 10,096,934 B1 | 10/2018 | Desjardins et al. |
| 10,103,528 B2 | 10/2018 | Lewinski |
| 10,119,631 B2 | 11/2018 | Toll et al. |
| D844,416 S | 4/2019 | Dyer |
| 10,316,991 B2 | 6/2019 | Gallion |
| 10,323,774 B2 | 6/2019 | Van Hulst et al. |
| 10,399,516 B2 | 9/2019 | Chapman |
| 10,428,976 B2* | 10/2019 | Matz ................ H02G 3/32 |
| 10,634,180 B2 | 4/2020 | Sawada |
| 10,663,089 B2 | 5/2020 | Sylvester |
| 10,680,421 B2 | 6/2020 | Ruebel |
| 10,895,707 B2 | 1/2021 | Borer et al. |
| 10,903,632 B2 | 1/2021 | Toll et al. |
| D909,843 S | 2/2021 | Van Hulst et al. |
| D909,844 S | 2/2021 | Van Hulst et al. |
| 10,920,910 B1 | 2/2021 | Gretz |
| 10,982,795 B2 | 4/2021 | Tally et al. |
| 11,015,742 B2 | 5/2021 | Locatelli et al. |
| 11,142,381 B1 | 10/2021 | Geiger et al. |
| 11,209,030 B2 | 12/2021 | Vaughn et al. |
| D948,304 S | 4/2022 | Hulst et al. |
| D948,981 S | 4/2022 | Van Hulst et al. |
| D950,370 S | 5/2022 | Devore et al. |
| 11,355,905 B2 | 6/2022 | Toll et al. |
| 11,505,378 B2 | 11/2022 | Geiger et al. |
| 11,539,194 B2 | 12/2022 | Lewinski et al. |
| 11,705,703 B2 | 7/2023 | Toll et al. |
| 11,738,922 B2* | 8/2023 | Geiger ............ B65D 63/1072 24/16 PB |
| 12,326,210 B2 | 6/2025 | Brucker et al. |
| 2002/0071715 A1 | 6/2002 | Geiger |
| 2002/0084388 A1 | 7/2002 | Geiger |
| 2002/0104196 A1 | 8/2002 | Geiger |
| 2002/0109050 A1 | 8/2002 | Winton, III |
| 2002/0179780 A1 | 12/2002 | Benoit et al. |
| 2003/0189140 A1 | 10/2003 | Takeuchi |
| 2003/0222184 A1 | 12/2003 | Geiger |
| 2003/0231943 A1 | 12/2003 | Detter et al. |
| 2004/0076465 A1 | 4/2004 | Geiger |
| 2004/0113024 A1 | 6/2004 | Caveney et al. |
| 2005/0116122 A1 | 6/2005 | Nakanishi |
| 2005/0242247 A1 | 11/2005 | Geiger |
| 2005/0253025 A1 | 11/2005 | Benoit et al. |
| 2006/0130286 A1 | 6/2006 | Igarashi et al. |
| 2006/0169482 A1 | 8/2006 | Hess et al. |
| 2006/0239796 A1 | 10/2006 | Franks |

(56) References Cited

U.S. PATENT DOCUMENTS

| | | |
|---|---|---|
| 2007/0023586 A1 | 2/2007 | Geiger |
| 2007/0034769 A1 | 2/2007 | Kwilosz |
| 2007/0065256 A1 | 3/2007 | Wakabayashi |
| 2007/0102594 A1 | 5/2007 | Geiger et al. |
| 2007/0134073 A1 | 6/2007 | Shereyk et al. |
| 2007/0138350 A1 | 6/2007 | Brown et al. |
| 2007/0205335 A1 | 9/2007 | Huebner et al. |
| 2007/0257159 A1 | 11/2007 | Nelson et al. |
| 2007/0272807 A1 | 11/2007 | Takagaki |
| 2007/0277352 A1 | 12/2007 | Maron et al. |
| 2007/0284486 A1 | 12/2007 | Smutny et al. |
| 2007/0290100 A1 | 12/2007 | Caveney |
| 2008/0078890 A1 | 4/2008 | Nelson et al. |
| 2008/0267686 A1 | 10/2008 | Blanks |
| 2008/0296444 A1 | 12/2008 | Geiger |
| 2009/0272093 A1 | 11/2009 | Kuebel |
| 2009/0307883 A1 | 12/2009 | Schliessner |
| 2010/0096511 A1 | 4/2010 | Olver |
| 2010/0207001 A1 | 8/2010 | Smith et al. |
| 2010/0219311 A1 | 9/2010 | Ng |
| 2010/0223765 A1 | 9/2010 | Vitali |
| 2010/0233917 A1 | 9/2010 | Sorensen |
| 2010/0243824 A1 | 9/2010 | Desai et al. |
| 2011/0068234 A1 | 3/2011 | Schaety et al. |
| 2011/0239412 A1 | 10/2011 | Sano et al. |
| 2012/0074278 A1 | 3/2012 | Hamaguchi |
| 2012/0217354 A1 | 8/2012 | Walraven et al. |
| 2012/0217355 A1 | 8/2012 | Geiger et al. |
| 2012/0227221 A1 | 9/2012 | Whitaker et al. |
| 2012/0286110 A1 | 11/2012 | Hill |
| 2013/0001373 A1 | 1/2013 | Ogawa |
| 2013/0119208 A1 | 5/2013 | Geiger |
| 2013/0160246 A1 | 6/2013 | Hajduch |
| 2013/0175410 A1 | 7/2013 | Caveney |
| 2014/0151514 A1 | 6/2014 | Asai |
| 2014/0283943 A1 | 9/2014 | Pecoraro |
| 2015/0121834 A1 | 5/2015 | Kim |
| 2016/0001944 A1 | 1/2016 | Aoyama |
| 2016/0047494 A1* | 2/2016 | Dickinson ............. F16G 11/143 248/74.1 |
| 2016/0114743 A1 | 4/2016 | Miyamoto et al. |
| 2016/0223100 A1 | 8/2016 | Geiger |
| 2016/0327187 A1 | 11/2016 | Brown |
| 2017/0122459 A1 | 5/2017 | Haynes et al. |
| 2017/0146154 A1 | 5/2017 | Tally et al. |
| 2017/0227141 A1 | 8/2017 | Toll et al. |
| 2017/0297516 A1 | 10/2017 | Loebe |
| 2018/0045337 A1 | 2/2018 | Gallion |
| 2018/0087692 A1 | 3/2018 | Geiger et al. |
| 2018/0231044 A1 | 8/2018 | Bejin et al. |
| 2018/0274699 A1 | 9/2018 | Ratzlaff et al. |
| 2018/0331523 A1 | 11/2018 | Ruebel |
| 2019/0036314 A1 | 1/2019 | Toll et al. |
| 2019/0293209 A1 | 9/2019 | Locatelli et al. |
| 2019/0331258 A1 | 10/2019 | Geiger et al. |
| 2020/0102979 A1 | 4/2020 | Bejin et al. |
| 2020/0132101 A1 | 4/2020 | Zander et al. |
| 2020/0208662 A1 | 7/2020 | Spearing |
| 2021/0119430 A1 | 4/2021 | Toll et al. |
| 2022/0033154 A1 | 2/2022 | Geiger et al. |
| 2022/0239080 A1 | 7/2022 | Toll et al. |
| 2022/0402667 A1 | 12/2022 | Geiger et al. |
| 2023/0092063 A1 | 3/2023 | Villbrandt |
| 2023/0256274 A1 | 8/2023 | Cherdo et al. |
| 2023/0304608 A1 | 9/2023 | Brucker et al. |
| 2023/0349491 A1 | 11/2023 | Fish |
| 2024/0003374 A1 | 1/2024 | Adams |
| 2024/0200711 A1 | 6/2024 | Pizon et al. |
| 2024/0209961 A1 | 6/2024 | Hopkins et al. |
| 2024/0360856 A1 | 10/2024 | Klos et al. |
| 2024/0360922 A1 | 10/2024 | Klos et al. |
| 2024/0384815 A1 | 11/2024 | Klos et al. |
| 2025/0122956 A1 | 4/2025 | Spangler et al. |
| 2025/0129813 A1 | 4/2025 | Toll et al. |
| 2025/0141199 A1 | 5/2025 | Cors et al. |

FOREIGN PATENT DOCUMENTS

| | | |
|---|---|---|
| CN | 1144313 | 3/1997 |
| CN | 101180488 | 5/2008 |
| CN | 101678933 A | 3/2010 |
| CN | 101785161 | 7/2010 |
| CN | 102472415 | 5/2012 |
| CN | 103998843 | 8/2014 |
| CN | 108457938 | 8/2018 |
| CN | 112796912 | 5/2021 |
| CN | 113503409 | 10/2021 |
| CN | 114607846 | 6/2022 |
| CN | 114673865 | 6/2022 |
| CN | 115031063 | 9/2022 |
| CN | 118049547 | 5/2024 |
| DE | 1275650 | 8/1968 |
| DE | 29904796 | 7/1999 |
| DE | 19856945 | 6/2000 |
| DE | 20004051 | 9/2000 |
| DE | 102006025706 | 12/2007 |
| DE | 102008059360 | 6/2010 |
| DE | 102009029957 | 2/2011 |
| DE | 102009034546 | 7/2011 |
| DE | 102011108849 | 1/2013 |
| DE | 102014003582 | 9/2015 |
| DE | 202016000926 U1 | 7/2016 |
| EP | 943240 | 10/1961 |
| EP | 0069223 | 1/1983 |
| EP | 0260740 | 3/1988 |
| EP | 0875695 | 11/1998 |
| EP | 1868272 | 12/2007 |
| EP | 1887232 | 2/2008 |
| EP | 1921362 | 5/2008 |
| EP | 2056419 | 5/2009 |
| EP | 2058242 | 5/2009 |
| EP | 1960677 B1 | 8/2009 |
| EP | 2116742 | 11/2009 |
| EP | 2162961 B1 | 3/2012 |
| EP | 2497991 | 9/2012 |
| EP | 3228880 | 10/2017 |
| EP | 2371046 | 1/2018 |
| EP | 2141397 | 1/2020 |
| EP | 3462042 B1 | 5/2022 |
| FR | 2322286 | 3/1977 |
| FR | 2437086 | 4/1980 |
| GB | 933929 | 8/1963 |
| GB | 1403714 | 8/1975 |
| GB | 1415097 | 11/1975 |
| GB | 1451009 | 9/1976 |
| GB | 2129863 | 5/1984 |
| GB | 2485249 | 5/2012 |
| IT | TV20080118 | 3/2010 |
| JP | H0543721 | 6/1993 |
| JP | 2002199555 | 7/2002 |
| JP | 2009044783 | 2/2009 |
| JP | 2013143842 | 7/2013 |
| JP | 2014108032 | 6/2014 |
| JP | 2014138517 | 7/2014 |
| JP | 2018071733 | 5/2018 |
| RU | 2535452 | 12/2014 |
| WO | 0025031 | 5/2000 |
| WO | 03095797 | 11/2003 |
| WO | 2006113867 | 10/2006 |
| WO | 2007133966 | 11/2007 |
| WO | 200901215 | 12/2008 |
| WO | 2009001215 A3 | 2/2009 |
| WO | 200901215 A8 | 8/2009 |
| WO | 2016134027 | 8/2016 |
| WO | 2019032276 | 2/2019 |
| WO | 2019051610 | 3/2019 |
| WO | 2022192680 | 9/2022 |
| WO | 2013044063 | 3/2023 |

OTHER PUBLICATIONS

"KZL strain relief plates—pluggable on 35 mm top hat DIN rails and C section rails C30", Retrieved at: https://www.icotek.com/en/products/strain-relief/kzl—on May 18, 2024, 7 pages.

(56) References Cited

OTHER PUBLICATIONS

"Panduit CBOT24K Cable Organizing Kit, Tool Kit Includes: Jacket Cover, Hook and Loop Fastener, Green Cable Organizing Insert, Yellow Cable Organizing Insert", Retrieved at: https://www.amazon.com/Panduit-CBOT24K-Cable-Organizing-Tool/dp/B00429P1OU—on May 18, 2024, 8 pages.
"ZL strain relief plates for screw assembly", Retrieved at: https://www.icotek.com/en/products/strain-relief/zl—on May 2018, 11 pages.
"Aluminium Frame Rail Mount—AFLM30-1", HellermannTyton, Mar. 2, 2016, 1 page.
"Aluminium Frame Rail Mount—AFLM40-1", Hellermann Tyton, Apr. 1, 2016, 1 page.
"Av-QualGear CM1-B-100-P Cable Tie Mount, Black", Retrieved at: https://www.qualgear.com/products/av/165/qualgear-cm1-b-100-p-cable-tie-mount-black—on Feb. 14, 2024, 7 pages.
"Cradle MB", https://www.hellermanntyton.com/shared/datasheets/CAD_141281.pdf, Apr. 10, 2023, 1 page.
"CT QM5", https://www.hellermanntyton.com/shared/datasheets/CAD_10-0635-001-csg.pdf, Mar. 25, 2011, 1 page.
"CTAM1-PEEK", https://www.hellermanntyton.com/shared/datasheets/CAD_12-0048-001-csg.pdf, Jan. 31, 2012, 1 page.
"CTM Series Cable Tie Mount", Retrieved at: https://www.hellermanntyton.com/shared/datasheets/CAD_16-1331-010_CSU.pdf—on Nov. 17, 2023, 1 page.
"CTM Series Cable Tie Mount", Drawing No. 11-0318-001-DTL, Jun. 18, 2021, 1 page.
"Extended European Search Report", EP Application No. 21178722.1, Nov. 15, 2021, 6 pages.
"Foreign Office Action", CN Application No. 202110830429.3, Jan. 31, 2024, 17 pages.
"Foreign Office Action", CN Application No. 202110830429.3, Jun. 1, 2023, 19 pages.
"Foreign Office Action", CN Application No. 202110830429.3, Oct. 27, 2023, 17 pages.
"FTH-27-12-01 Essentra Compontents", Retrieved at: https://www.digikiey.com/en/products/detail/essentra-components/FTH-27-12-01/391736—on Feb. 14, 2024, 4 pages.
"J-Pro Cable Support Sstem—Let Panduit Support Your Cables", Retrieved at; https://www.panduit.com/content/dam/panduit/en/products/media/7/17/117/1117/98451117.pdf—on Apr. 8, 2024, 6 pages.
"Magnetic Clip, 1 in. bundle diam., Large, 15 lbf pull rate", https://assets.hellermanntyton.us/m/ea259b2011e4157d/original/23-0068-001-CSU-pdf.pdf—Drawing No. 23-0068-001-CSU, Apr. 20, 2023, 1 page.
"Magnetic J-Hook, 2 in. diam. hook, Side Mount, 90 lbf pull rate", https://assets.hellermanntyton.us/m/c1c46e98190880c0/original/23-0075-001-CSU-pdf.pdf—Drawing No. 23-0075-001-CSU, Apr. 20, 2023, 1 page.
"Metal Content Aluminium Frame Rail Mount—MCAFLM30-1-BLU", HellermanTytan, May 18, 2018, 1 page.
"Metal Content Aluminium Frame Rail Mount—MCAFLM40-1-BLU", Jan. 31, 2019, 1 page.
"Notice of Allowance", U.S. Appl. No. 16/940,262, Jun. 11, 2021, 7 pages.
"Notice of Allowance", U.S. Appl. No. 17/483,198, Aug. 24, 2022, 7 pages.
"NSi Industries 0.120 in. Hole Saddle Tie Mount,", Retrieved at: https://www.homedepot.com/p/NSi-Industries-0-120-in-Hole-Saddle-Tie-Mount-Black-100-Pack-SM-1-B/307271139—on Feb. 14, 2024, 8 pages.
"Panduit ABMT-S6-Q60: Amazon.com: Industrial & Scientific", Retrieved at: https://www.amazon.com/Panduit-ABMT-S6-Q60/dp/B00HW8R6B4—on Feb. 14, 2024, 10 pages.
"Phoenix Contact—3240703—Black Nylon Fixing Cable Tie; 15mm×9.5; WT-Base HF 5 Wire Tie Series—RS", Retrieved at: https://us.rs.online.com/product/phoenix-contact/3240703/702353254/—on Feb. 14, 2024, 10 pages.
"Snapklik.com : Helonge Cable Tie Mounting, 100 Pcs Zip Tie Base, 5 Mm", Retrieved at: https://snapklik.com/en-aw/product/helonge-cable-tie-mounting-100-pcs-zip-tie-base-5-mm-m5-screw-hole-23x16x9-lwh-mm-cord-tie-mount-wire-tie-holder-fix-bottom-wire-management-for-home-office-outdoor-garden/08ZU4P27YA365—on Feb. 14, 2024, 7 pages.
"T5OR Standard Cable Tie with EC4 Mount", https://assets.hellermanntyton.us/m/498a2a1c9ba3f6bf/original/CT2050058CST.pdf, Jun. 29, 2009, 1 page.
"1-Piece Cable Tie/Arrowhead Mount with Wings—126-00042", Retrieved at: https://www.hellermanntyton.us/products/126-00042/—on Apr. 25, 2023, 6 pages.
"2-Piece Cable Tie & Edge Clip—156-00537", Retrieved at: https://www.hellermanntyton.us/products/156-00537/—on Apr. 25, 2023, 5 pages.
"2-Piece Cable Tie & Edge Clip—156-00541", Retrieved at: https://www.hellermanntyton.us/products/156-00541/—on Apr. 25, 2023, 5 pages.
"2-Way Saddle Mount—S2HM250HIRHSH1", Retrieved at: https://www.hellermanntyton.us/products/151-29403/—on Apr. 25, 2023, 5 pages.
"Cable Tie Anchor Mount—Part No. CTAM110C2", Retrieved at: https://www.hellermanntyton.us/products/151-31103/—on Apr. 25, 2023, 4 pages.
"Dual Swivel Saddle Spacer for T50-T250—DSWS50HSH1", Retrieved at: https://www.hellermanntyton.us/products/151-06501/—on Apr. 25, 2023, 4 pages.
"Extended European Search Report", EP Application No. 24172819.5, Sep. 13, 2024, 10 pages.
"High Torque Mount—151-02094", Retrieved at: https://www.hellermanntyton.us/products/151-02094/—on Apr. 25, 2023, 5 pages.
"Rubber Adhesive Cable Tie Mount—MB3A10C2", Retrieved at: https://www.hellermanntyton.us/products/151-28718/—on Apr. 25, 2023, 4 pages.
"Extended European Search Report", EP Application No. 24172843.5, Oct. 14, 2024, 9 pages.
"Foreign Office Action", CN Application No. 202110830429.3, Dec. 5, 2024, 23 pages.
"Advisory Action", U.S. Appl. No. 15/094,713, Feb. 22, 2018, 3 pages.
"Advisory Action", U.S. Appl. No. 15/094,713, Mar. 6, 2020, 3 pages.
"Advisory Action", U.S. Appl. No. 10/835,864, May 5, 2006, 3 pages.
"Advisory Action", U.S. Appl. No. 10/835,864, Aug. 30, 2007, 3 pages.
"ARaymond—Clipping Systems", Retrieved at: https://www.araymond-industrial.com/en/technologies/clipping-systems—on Jan. 10, 2025, 6 pages.
"Automotive edge mounting cable clips 082047001", Retrieved at: https://anemo.eu/automotive/082047001—on Jan. 17, 2023, 7 pages.
"Edge Clips", Retrieved at: https://wkk-automotive.com/en/fixation-clips/edge-clips/—on Jan. 17, 2023, 3 pages.
"European Search Report", EP Application No. 18200778.1, Feb. 6, 2019.
"Ex Parte Quayle", U.S. Appl. No. 18/125,321, Feb. 27, 2025, 6 pages.
"Extended European Search Report", EP Application No. 22305157.4, Jul. 18, 2022, 10 pages.
"Extended European Search Report", EP Application No. 19199457.3, Jul. 27, 2020, 11 pages.
"Extended European Search Report", EP Application No. 22315331.3, May 16, 2023, 8 pages.
"Extended European Search Report", EP Application No. 17154684.9, Jun. 22, 2017, 8 pages.
"Extended European Search Report", EP Application No. 17164002.2, Sep. 5, 2017, 8 pages.
"Extended European Search Report", EP Application No. 2318950.9, Nov. 23, 2023, 8 pages.
"Extended European Search Report", EP Application No. 24205213.2, Mar. 6, 2025, 9 pages.
"Extended European Search Report", EP Application No. 24176442.2, Oct. 30, 2024, 9 pages.

(56) References Cited

OTHER PUBLICATIONS

"Fastening Systems Product Catalog", Retrieved at: https://www.araymond-automotive.com/sites/default/files/medias/document/2021/ARaymond_Product-Catalog_2021_EN.pdf—on Jan. 17, 2023, 576 pages.
"Final Office Action", U.S. Appl. No. 15/094,713, Jan. 30, 2017, 11 pages.
"Final Office Action", U.S. Appl. No. 10/835,864, May 31, 2007, 11 pages.
"Final Office Action", U.S. Appl. No. 17/658,730, Dec. 27, 2022, 11 pages.
"Final Office Action", U.S. Appl. No. 13/220,308, Dec. 11, 2013, 12 pages.
"Final Office Action", U.S. Appl. No. 15/094,713, Nov. 30, 2017, 13 pages.
"Final Office Action", U.S. Appl. No. 15/094,713, Feb. 6, 2020, 26 pages.
"Final Office Action", U.S. Appl. No. 15/970,173, Feb. 21, 2020, 6 pages.
"Final Office Action", U.S. Appl. No. 10/835,864, Mar. 24, 2006, 8 pages.
"Final Office Action", U.S. Appl. No. 11/191,654, Oct. 9, 2007, 9 pages.
"Final Office Action", U.S. Appl. No. 11/580,363, Oct. 16, 2009, 9 pages.
"Foreign Office Action", CN Application No. 201910924869.8, Sep. 9, 2021, 10 pages.
"Foreign Office Action", CN Application No. 201710229338.8, Oct. 8, 2018, 12 pages.
"Foreign Office Action", CN Application No. 201710066210.4, Jan. 21, 2020, 13 pages.
"Foreign Office Action", CN Application No. 201910924869.8, Jun. 15, 2021, 13 pages.
"Foreign Office Action", CN Application No. 201710229388.8, Dec. 20, 2019, 15 pages.
"Foreign Office Action", CN Application No. 201710229388.8, Jun. 24, 2019, 16 pages.
"Foreign Office Action", KR Application No. 10-2019-0117178, Sep. 1, 2020, 16 pages.
"Foreign Office Action", CN Application No. 202011230192.7, Oct. 13, 2022, 17 pages.
"Foreign Office Action", CN Application No. 201910924869.8, Dec. 25, 2020, 21 pages.
"Foreign Office Action", KR Application No. 10-2023-0082314, Mar. 31, 2025, 22 pages.
"Foreign Office Action", JP Application No. 2019-164417, Apr. 15, 2021, 4 pages.
"Foreign Office Action", EP Application No. 17164002.2, Aug. 16, 2018, 4 pages.
"Foreign Office Action", EP Application No. 19199457.3, Dec. 3, 2020, 4 pages.
"Foreign Office Action", EP Application No. 22315331.3, Mar. 6, 2025, 6 pages.
"Foreign Office Action", CN Application No. 201710229388.8, Jul. 1, 2020, 8 pages.
"Foreign Office Action", JP Application No. 2019-164417, Oct. 6, 2020, 8 pages.
"Foreign Office Action", CN Application No. 202011230192.7, Jun. 14, 2022, 9 pages.
"HellermannTyton—Snap Hose Clamp—CP2000001SER", 1 page, Aug. 29, 2000.
"HellermannTyton Product Catalog—North America 2019/2020", Retrieved at: https://www.hellermanntyton.us/get-the-hellermanntyton-2019-2020-product-catalog—on Apr. 11, 2025, pp. 139-146.
"HellermannTyton Solar Brochure", 37 pages, Feb. 2021.
"Heyco Heavy Duty Locket P Clamps", Retrieved at: https://www.heyco.com/Solar_Power_Components/product.cfm?product=Lockit-P-Clamps&section=Solar_Power_Components, Nov. 26, 2022, 2 pages.
"Non-Final Office Action", U.S. Appl. No. 15/423,419, Jan. 11, 2018, 10 pages.
"Non-Final Office Action", U.S. Appl. No. 17/136,945, Sep. 15, 2021, 10 pages.
"Non-Final Office Action", U.S. Appl. No. 15/970,173, Sep. 17, 2019, 11 pages.
"Non-Final Office Action", U.S. Appl. No. 18/541,716, Jun. 11, 2025, 11 pages.
"Non-Final Office Action", U.S. Appl. No. 13/220,308, Feb. 14, 2014, 12 pages.
"Non-Final Office Action", U.S. Appl. No. 15/094,713, May 30, 2017, 12 pages.
"Non-Final Office Action", U.S. Appl. No. 13/738,567, Mar. 27, 2015, 13 pages.
"Non-Final Office Action", U.S. Appl. No. 17/658,730, Sep. 13, 2022, 13 pages.
"Non-Final Office Action", U.S. Appl. No. 15/094,713, Jun. 22, 2016, 17 pages.
"Non-Final Office Action", U.S. Appl. No. 16/510,065, Aug. 29, 2019, 20 pages.
"Non-Final Office Action", U.S. Appl. No. 15/094,713, Feb. 14, 2019, 26 pages.
"Non-Final Office Action", U.S. Appl. No. 16/147,668, May 13, 2020, 5 pages.
"Non-Final Office Action", U.S. Appl. No. 10/835,864, Aug. 25, 2006, 6 pages.
"Non-Final Office Action", U.S. Appl. No. 12/221,632, Nov. 27, 2009, 6 pages.
"Non-Final Office Action", U.S. Appl. No. 18/166,664, May 7, 2024, 6 pages.
"Non-Final Office Action", U.S. Appl. No. 13/220,308, Jun. 20, 2013, 7 pages.
"Non-Final Office Action", U.S. Appl. No. 13/738,567, Oct. 8, 2015, 7 pages.
"Non-Final Office Action", U.S. Appl. No. 18/321,570, Dec. 17, 2024, 7 pages.
"Non-Final Office Action", U.S. Appl. No. 10/835,864, Oct. 6, 2005, 8 pages.
"Non-Final Office Action", U.S. Appl. No. 11/580,363, Dec. 22, 2008, 8 pages.
"Non-Final Office Action", U.S. Appl. No. 11/191,654, Jun. 9, 2006, 9 pages.
"Notice of Allowance", U.S. Appl. No. 16/147,668, Jul. 2, 2018, 10 pages.
"Notice of Allowance", U.S. Appl. No. 17/136,945, Mar. 3, 2022, 5 pages.
"Notice of Allowance", U.S. Appl. No. 10/835,864, May 27, 2011, 5 pages.
"Notice of Allowance", U.S. Appl. No. 16/147,668, Sep. 17, 2020, 5 Pages.
"Notice of Allowance", U.S. Appl. No. 18/321,570, Apr. 30, 2025, 5 pages.
"Notice of Allowance", U.S. Appl. No. 12/221,632, Mar. 30, 2010, 6 pages.
"Notice of Allowance", U.S. Appl. No. 17/658,730, Mar. 2, 2023, 7 pages.
"Notice of Allowance", U.S. Appl. No. 11/580,363, Mar. 29, 2010, 7 pages.
"Notice of Allowance", U.S. Appl. No. 11/191,654, Jul. 10, 2008, 7 pages.
"Notice of Allowance", U.S. Appl. No. 15/970,173, Mar. 11, 2020, 9 pages.
"Notice of Allowance", U.S. Appl. No. 18/125,321, Apr. 25, 2025, 9 pages.
"Panduit—Range Taking Clamp", 1 page, Jan. 24, 2022.
"Panduit—Range Taking Clamps Product Bulletin", 2 pages, May 2022.
"Partial European Search Report", EP Application No. 19199457.3, Feb. 5, 2020, 12 pages.
"PEX Bend Support", Retrieved at: https://www.sharkbite.com/us/en/pex-pipe/pipe-supports/pex-bend-support—on Apr. 11, 2025, 4 pages.

(56) References Cited

OTHER PUBLICATIONS

"Restriction Requirement", U.S. Appl. No. 12/221,632, Jul. 7, 2009, 5 pages.
"Restriction Requirement", U.S. Appl. No. 16/147,668, Feb. 18, 2020, 6 pages.
"Restriction Requirement", U.S. Appl. No. 15/970,173, May 17, 2019, 6 pages.
"Restriction Requirement", U.S. Appl. No. 11/580,363, Oct. 2, 2008, 6 pages.
"Restriction Requirement", U.S. Appl. No. 18/125,321, Nov. 26, 2024, 6 pages.
"Restriction Requirement", U.S. Appl. No. 18/647,914, May 21, 2025, 6 pages.
"Restriction Requirement", U.S. Appl. No. 15/423,419, Dec. 13, 2017, 7 pages.
"Solar Energy—Reliable Cable Management Solutions for Solar Plants", Retrieved at: https://www.hellermanntyton.com/shared/datasheets/1820602.pdf—on Mar. 15, 2023, 37 pages.
"Specification Sheet—Part No. 151-01567", Retrieved at: https://cl-pdfv10.ae-admin.com/hellermanntyton/files/151-01567.pdf—on May 30, 2024, 4 pages.
"Specification Sheet—Part No. 156-02230", Retrieved at: https://cl-pdfv10.ae-admin.com/hellermanntyton/files/156-02230.pdf—on May 30, 2024, 4 pages.
"T50R Standard Cable Tie With EC4 Mount", Retrieved at: https://assets.hellermanntyton.us/m/dca0af47ad9b8a65/original/10-0831-006-CSU-pdf.pdf, Mar. 20, 2017, 1 page.
"Wedge Clip", Drawing No. 13-0119-200-CSU, Oct. 10, 2016, 1 page.
"WKK Automotive Catalogue", Retrieved at: https://wkk-automotive.com/wp-content/uploads/2019/04/Catalogue-WKK-Automotive.pdf—on Jan. 17, 2023, 5 pages.
"ZipShield—Pile Mount Wire Protector", Copyright 2021, Jan. 2021, 1 page.
Cab Solar, "Torque Tube Hangers Quick and Easy Under Panel Cable Management", https://www.cabproducts.com/wp-content/uploads/2022/08/CAB-Solar-Tube-Hangers-SalesSheet5-AUG2022A.pdf, Aug. 2022, 2 pages.
Santinello, Roberto, "Corrugated Pipe Holder Structure Particularly for Plasterboard Walls, English Translation", Mar. 23, 2010, 6 pages.
"Non-Final Office Action", U.S. Appl. No. 18/647,914, Aug. 27, 2025, 13 pages.
"Non-Final Office Action", U.S. Appl. No. 18/647,806, Sep. 23, 2025, 9 pages.
"Restriction Requirement", U.S. Appl. No. 18/748,509, 6 pages.
"SMH1 Solar Metal Hanger", Drawing No. 21-3196-001-CSU, Nov. 9, 2021, 1 page.
"Solar Module Cable Hanger, 3mm Wire, 25 lb. Load Rating, Aluminum Alloy, 3000/carton", Retrieved at: https://www.hellermanntyton.us/products/151-03631/—on Jul. 28, 2025, 1 page.

* cited by examiner

CRADLE MOUNT FIXINGS

INCORPORATION BY REFERENCE

This application claims the benefit of U.S. Provisional Application Ser. No. 63/591,911, filed Oct. 20, 2023, and U.S. Provisional Application Ser. No. 63/499,109, filed on Apr. 28, 2023, the disclosures of which are incorporated by reference herein in their entireties.

BACKGROUND

A fixing is used to attach a component to a workpiece (e.g., a support beam, a housing). Fixings are frequently used in machinery installations to locate a component in a fixed position relative to other components and/or equipment. A fixing may include a mounting section configured to attach to the workpiece and a cradle portion that is configured to support the component.

SUMMARY

This document describes improved cradle mount fixings. In some aspects, the techniques described herein relate to a cradle mount fixing for attaching a component to a workpiece, the cradle mount fixing including: a cradle section defining a channel configured for receiving the component, the cradle section including: a body section; a first cradle portion, the first cradle portion including: a pair of first cradle arms that define a first cradle therebetween, the first cradle arms including proximal ends opposite distal ends, the proximal ends of the first cradle arms extending from the body section, the first cradle arms defining inwardly extending first retainer tabs, the first retainer tabs configured for retaining the component in the first cradle; a second cradle portion, the second cradle portion including: a pair of second cradle arms that define a second cradle therebetween, the second cradle arms including proximal ends opposite distal ends, the proximal ends of the second cradle arms extending from the body section, the second cradle arms defining inwardly extending second retainer tabs, the second retainer tabs configured for retaining the component in the second cradle; a mounting section configured for attachment to the workpiece to secure the cradle mount fixing to the workpiece, the mounting section connected to the cradle section; and a cable tie portion connected to the cradle section, the cable tie portion configured to wrap around and secure the component in the channel to the body section.

In some aspects, the techniques described herein relate to a cradle mount fixing for attaching a component to a workpiece, the cradle mount fixing including: a mounting section configured for attachment to the workpiece to secure the cradle mount fixing to the workpiece; a cradle section connected to the mounting section, the cradle section defining a channel configured for receiving the component, the cradle section including: a body section, the body section including: a body first end opposite a body second end; a first stand-off member that extends from the body section at the body first end; a second stand-off member that extends from the body section at the body second end; a first cradle portion that extends from the first stand-off member, the first cradle portion including: a pair of first cradle arms that define a first cradle therebetween, the first cradle arms including proximal ends opposite distal ends, the proximal ends of the first cradle arms extending from the body section, the distal ends of the first cradle arms defining inwardly extending first retainer tabs, the first retainer tabs configured for retaining the component in the first cradle; a second cradle portion that extends from the second stand-off member, the second cradle portion including: a pair of second cradle arms that define a second cradle therebetween, the second cradle arms including proximal ends opposite distal ends, the proximal ends of the second cradle arms extending from the body section, the distal ends of the second cradle arms defining inwardly extending second retainer tabs, the second retainer tabs configured for retaining the component in the second cradle; and a cable tie portion integrally formed with the cradle section, the cable tie portion configured to wrap around and secure the component in the channel to the body section of the cradle section.

This Summary is provided to introduce simplified concepts of cradle mount fixings, which are further described below in the Detailed Description and are illustrated in the Drawings. This Summary is not intended to identify essential features of the claimed subject matter, nor is it intended for use in determining the scope of the claimed subject matter.

BRIEF DESCRIPTION OF THE DRAWINGS

The details of one or more aspects of cradle mount fixings are described with reference to the following Drawings, in which the use of the same numbers in different instances may indicate like features and/or components.

DETAILED DESCRIPTION

Described and illustrated are aspects of an improved cradle mount fixing (referred to individually herein as a "fixing"). A disclosed cradle mount fixing may be configured to receive, secure, and/or support one or more component(s) in a cradle, temporarily and/or until permanent retention is desired with a cable tie. The disclosed cradle mount fixings may operate as hands-free routing devices that are configured to aid installers by temporarily holding components (e.g., cables, bundles) while the components are routed. In this way, the cradle mount fixings may be configured to allow the components to more easily push in to a cradle of the cradle mount fixing than to pull out of the cradle. The cradle mount fixings may further include a cable tie portion that may be utilized after routing is completed to retain the components in the channel (e.g., cradle). A cradle mount fixing may be utilized in a system that also includes the component(s) and/or the workpiece.

Figure 1:
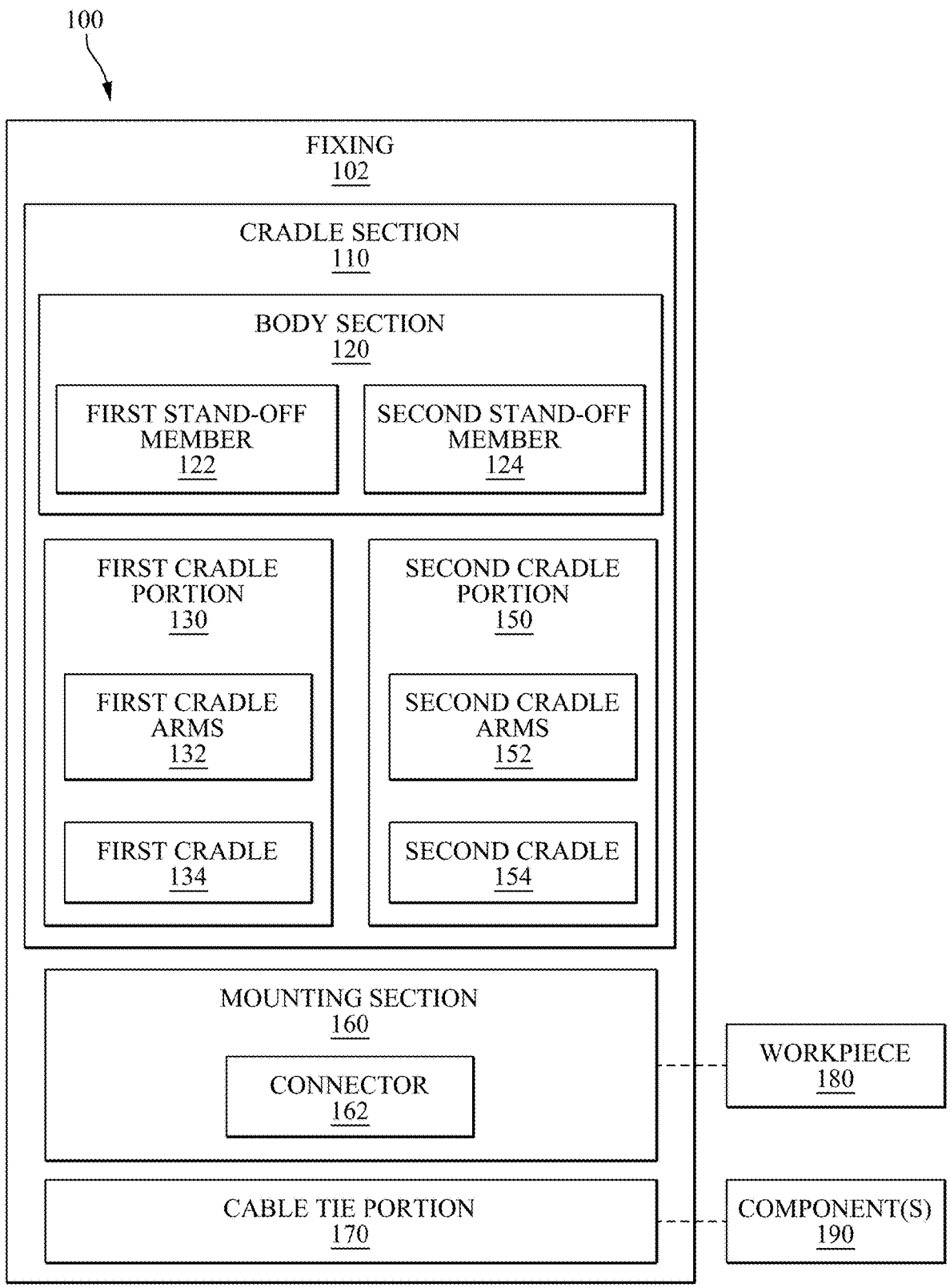
FIG. 1 is a schematic illustration of a cradle mount fixing.

FIG. 1 is a schematic illustration of a system 100 that includes a fixing 102, a workpiece 180, and component(s) 190. The fixing 102 is configured for receiving, securing, and/or supporting the component(s) 190 on or to the workpiece 180. The component(s) 190 may include one or more objects (e.g., elongated articles, wires, hoses, tubes, cables, and the like) and/or bundles thereof. The workpiece 180 may include one or more support structures (e.g., a vehicle chassis, a panel, a frame rail, a support beam, a housing, wall, floor, ceiling, or the like). The workpiece 180 may include a mounting aperture defined therein (e.g., a slot, a channel, a bore, a threaded hole, and the like) and/or a mounting surface. The mounting aperture and/or the mounting surface of the workpiece 180 may be configured to receive a connector 162, as discussed below.

The fixing 102 may include a mounting section 160, which is configured for attachment to the workpiece 180 at a desired location. In this way, the fixing 102 is configured for attachment to the workpiece 180 at the desired location via the mounting section 160. The mounting section 160 may be connected to a cradle section 110. The mounting section 160 may be spaced apart from a first end of a body section 120 and a second end of the body section 120.

The mounting section 160 may include a connector 162 that is configured to attach the mounting section 160 to the workpiece 180. The connector 162 may include any common connection manner, including, but not limited to, a fastener (e.g., a blind hole fastener, a clamp fastener, a mechanical fastener, an arrowhead fastener, a fir-tree fastener, a mounting edge clip, a twist-lock fastener configured for receipt into the slot of a rail, a weld stud mount, a cable attachment, a hose attachment), an adhesive fastener, a friction fit, and the like. The connector 162 may be an aperture (e.g., mounting hole) that is defined through the mounting section 160, the aperture configured to receive a fastener (e.g., a bolt, a screw) that engages a mounting aperture (e.g., a bore) that is defined in the workpiece 180. In other aspects, the connector 162 may be configured to engage an elongated fastener (e.g., a stud, a threaded bolt) extending from the workpiece 180, may be configured to clamp onto an edge of the workpiece 180 (e.g., utilizing an edge clip), and/or the like. In aspects, the connector 162 is a fastener aperture (e.g., a recessed fastener aperture) that is defined through the mounting section 160, and the connector 162 is configured to receive a fastener (e.g., a threaded bolt, a screw, a M5 stud mount, a M6 stud mount) therethrough, which is configured to engage the workpiece 180 (e.g., engage a mounting aperture that is defined in the workpiece). In another example, the connector 162 may be a screw attachment that fastens with a screw and T-nut (e.g., Tee nut) to the workpiece (e.g., a #8 (M4) screw that is configured for attachment into a panel surface or with T-nut in frame). In another example, the mounting section 160 may utilize an adhesive fastener to mount to the mounting surface of the workpiece 180 and the connector 162 is a surface of the mounting section 160 to which the adhesive fastener is mounted. The adhesive fastener may be a double-sided adhesive tape, a double-stick adhesive foam, a pressure-sensitive adhesive tape, and the like. In other aspects, the workpiece 180 may attach to the fixing 102 via an elongated fastener (e.g., a stud, a threaded bolt) that extends from the workpiece 180, by the mounting section 160 clamping onto an edge of the workpiece 180, and the like.

The fixing 102 includes the body section 120, which is configured to mount on the workpiece 180 via the mounting section 160. The body section 120 may include the first end that is opposite to the second end. These opposing ends may define a length therebetween. The length of the body section 120 defines a body plane. For the purposes of this disclosure, the terms "upward" and "downward" refer to the directions with respect to the body plane (e.g., body plane ($B_P$) in FIG. 2A) of the fixing (e.g., fixing 202)). The term "upward" (e.g., upwardly) refers to the direction away from the body plane, whereas the term "downward" (e.g., downwardly) refers to the direction towards the body plane. The body plane may be orthogonal to a center axis (e.g., center axis ($A_x$) in FIG. 3C) of the fixing (e.g., fixing 202), described below. For the purposes of this disclosure, the terms "inward" and "outward" are used to refer to directions with respect to the center axis (e.g., center axis ($A_x$) in FIG. 3C) of the fixing (e.g., fixing 202) of the fixing. The term "inward" (e.g., inner, inwardly) refers to the direction that is toward (e.g., nearer) the center axis, whereas the term "outward" (e.g., outer, outwardly) refers to a direction opposite to "inward," that is, in a direction that is away from (e.g., further from) the center axis. The center axis may be orthogonal to the body plane (e.g., body plane ($B_P$) in FIG. 2A) of the fixing.

The body section 120 may include at least one stand-off member (e.g., first stand-off member 122, second stand-off member 124), which is configured to space cradle portions (e.g., first cradle portion 130, second cradle portion 150) apart from one another, apart from the mounting section 160, and/or apart from a cable tie portion 170. The first cradle portion 130 may be oriented parallel to the second cradle portion 150. The cradle mount fixing 102 includes the cable tie portion 170 (e.g., an adjustable band clamp, an integral cable tie). The cable tie portion 170 may include a reusable elongated strap and a releasable pawl in a locking head. The cable tie portion 170 may extend from and/or attach to the body section 120. The cable tie portion 170 may be integrally formed with the cradle section 110. The cable tie portion 170 is utilized to attach (e.g., "cinch down") component(s) 190 to the fixing 102 and is configured to wrap around and secure the component(s) 190 (e.g., wrap around and secure the component(s) 190 in a channel defined in the cradle section 110) to the body section 120.

In aspects, a cable tie portion 170 includes a head end and a tail end. The head end includes a locking head (e.g., locking head) and the tail end includes an elongated strap (e.g., elongated strap). In such a configuration, the elongated strap may be configured for insertion through the locking head to form a loop (e.g., a loop around component(s)). In aspects, the elongated strap may extend from the locking head. In other aspects, the elongated strap may be spaced apart from the locking head. The elongated strap defines a length and may include a plurality of strap serrations defined on at least one lengthwise side of the elongated strap. A pawl mechanism of the locking head is configured for engaging strap serrations defined on the elongated strap, thereby retaining the strap relative to the locking head. The plurality of strap serrations on the elongated strap enables a variable portion of the elongated strap to be inserted through the locking head, which provides an installer with the ability to vary the length of the cable tie portion 170. In this way, the cable tie portion 170 may be length adjustable. The locking head may include a slot that extends through the locking head. The slot is configured to receive the elongated strap. The locking head has a top side and a bottom side, with the slot defined therebetween. The slot is configured to receive the elongated strap, such as the tail end of the elongated strap. The pawl mechanism may include a pawl hingedly disposed within the slot. The pawl includes at least one pawl tooth (e.g., pawl teeth) that is configured to engage at least one of the strap serrations on the elongated strap when the elongated strap is disposed within the slot. The pawl mechanism may be disposed within the slot such that when the elongated strap is disposed within the slot, the pawl mechanism engages the elongated strap to allow unidirectional movement of the elongated strap through the slot in a first direction and resist movement of the elongated strap in an opposite direction.

The locking head may include a release feature (e.g., unlocking tab, unlocking lever) configured to permit the pawl mechanism to be released from engagement with the strap serrations of the strap, thereby enabling the cable tie portion 170 to be removed from securing the component(s) 190. The release feature may be configured to enable an operator to digitally manipulate (e.g., utilizing a finger of the operator, utilizing a tool) the release feature to disengage the pawl teeth on the pawl from engagement with the strap serrations. Disengagement of the pawl teeth from the strap serrations permits the elongated strap to be withdrawn from the locking head and the cable tie portion 170 to be removed from securing the component(s) 190.

The cradle section 110 of the cradle mount fixing 102 defines a channel that is configured for receiving the component(s) 190. For example, the cradle section 110 may include at least one cradle portion (e.g., first cradle portion 130, second cradle portion 150), which defines a cradle (e.g., first cradle 134, second cradle 154). The cradle is configured to temporarily hold and/or support (e.g., by cradling) component(s) 190 at a desired mounting location (e.g., on a workpiece 180) while the installer is routing the component(s) 190 along a routing path. For example, holding the component(s) 190 in the channel (e.g., cradle) before the application of the cable tie portion 170 to attach the component(s) 190 in the channel (e.g., first cradle 134, second cradle 154) may loosely (e.g., without utilizing the cable tie portion 170) hold the component(s) 190 in place while they are being strung. Once the component(s) 190 are routed, the installer may then bundle the component(s) 190 together into a bundle utilizing the cable tie portion 170. In this way, an installer does not need to use temporary strapping material (e.g., cable tie, plastic band, flexible band, metal band, string, twine, wire) to create temporary bundles of the component(s) 190. Instead, the installer can route all the component(s) 190 and then apply the cable tie portion 170 to create bundle(s). Doing so avoids the need for the installer to, for every new component that is added to a string, remove temporary strapping material (e.g., by cutting a disposable cable tie) and add new strapping material (e.g., add a new cable tie). This is in contrast to some prior systems where for every new component that was added to a string, an existing bundle would need to be held in place while existing cable ties were cut and new cable ties were re-added. Loosely holding the component(s) 190 in place while they are being strung decreases the time and labor involved in running the component(s) 190 during an installation process.

The cradle portion (e.g., first cradle portion 130, second cradle portion 150) may include a support base that is configured to support the component(s) 190 held by the cradle portion. In aspects, the support base is an inwardly facing (e.g., cradle facing) side of the body section 120. In one example, the support base may support the component(s) 190 before the cable tie portion 170 is formed into a loop around the component(s) 190, as illustrated in FIGS. 3C and 4C. In another example, the support base may support the component(s) 190 after the cable tie portion 170 is formed into a loop around the component(s) 190, as illustrated in FIG. 3C. In a further example, the support base may at least partially support the component(s) 190 when the fixing (e.g., fixing 202 (illustrated in FIG. 4B)) is in a side-loading configuration. A stand-off member may provide a support base that is configured to support component(s) held by a cradle portion.

A cradle portion may include a pair of cradle arms. For example, the first cradle portion 130 may include a pair of first cradle arms 132 and the second cradle portion 150 may include a pair of second cradle arms 152. The pairs of cradle arms (e.g., the pair of first cradle arms 132, the pair of second cradle arms 152) may define cradles therebetween. For example, the pair of first cradle arms 132 may define a first cradle 134 therebetween and the pair of second cradle arms 152 may define a second cradle 154 therebetween. The cradle arm(s) may extend from the body section 120. For example, first cradle arms 132 may extend from a first stand-off member 122 of the body section 120 and the second cradle arms 152 may extend from a second stand-off member 124 of the body section 120. The cradle arms include proximal ends opposite distal ends. The proximal ends may connect to and extend from the body section 120 in a downward direction, away from the body plane of the body section 120. In aspects, the cradle arm(s) are curved.

The cradle arm includes at least one inwardly extending retainer tab. The retainer tab(s) are configured for retaining the component(s) 190 in the channel (e.g., first cradle 134, second cradle 154). For example, first retainer tabs extending from the distal ends of the cradle arms of the pair of first cradle arms 132 may be configured for retaining the component(s) 190 in the first cradle 134, and second retainer tabs extending from the distal ends of the cradle arms of the pair of second cradle arms 152 may be configured for retaining the component(s) 190 in the second cradle 154. The retainer tabs may be flexible. In aspects, a distal end of a cradle arm defines the at least one inwardly extending retainer tab. The first retainer tabs may be spaced apart to define a first gap therebetween. The second retainer tabs may be spaced apart to define a second gap therebetween. The first cradle arms, the second cradle arms, the first retainer tabs, and/or the second retainer tabs may be configured to flex to permit the component(s) 190 to be passed through at least one of the first gap or the second gap and into the channel. The gap (e.g., first gap, second gap) may function as a one-way valve that holds the component(s) 190 within the channel, for example, against gravity forces. The fixing 102 may be further configured to permit the removal of one or more component(s) 190 from the channel through the gap by the installer's application of a manual force to at least one of the cradle arms and/or the retainer tabs to widen the gap and permit the component(s) 190 to be passed through the gap and out of the channel.

The fixings (e.g., fixing 102, fixing 202) described herein and illustrated in the drawings simplify component installation and rework. When routing component(s) 190, the component(s) 190 are held in place and the fixings temporarily hold the component(s) 190 along a routing path until an installer is ready to fix the routed component(s) 190 in place along the routing path. This allows for installation verification before the need to fasten the component(s) into a bundle to the fixing. This reduces component installation time, simplifies component installation and rework, and facilitates installation verification (e.g., by a supervisor) before the final bundle is formed and attached to the fixing.

The component(s) 190 may be secured in a cradle (e.g., first cradle 134, second cradle 154) to the cradle portion (e.g., first cradle portion 130, second cradle portion 150) via the cable tie portion 170. In this way, the component(s) 190 may be bundled together into a bundle utilizing the cable tie portion 170.

Figure 2A:
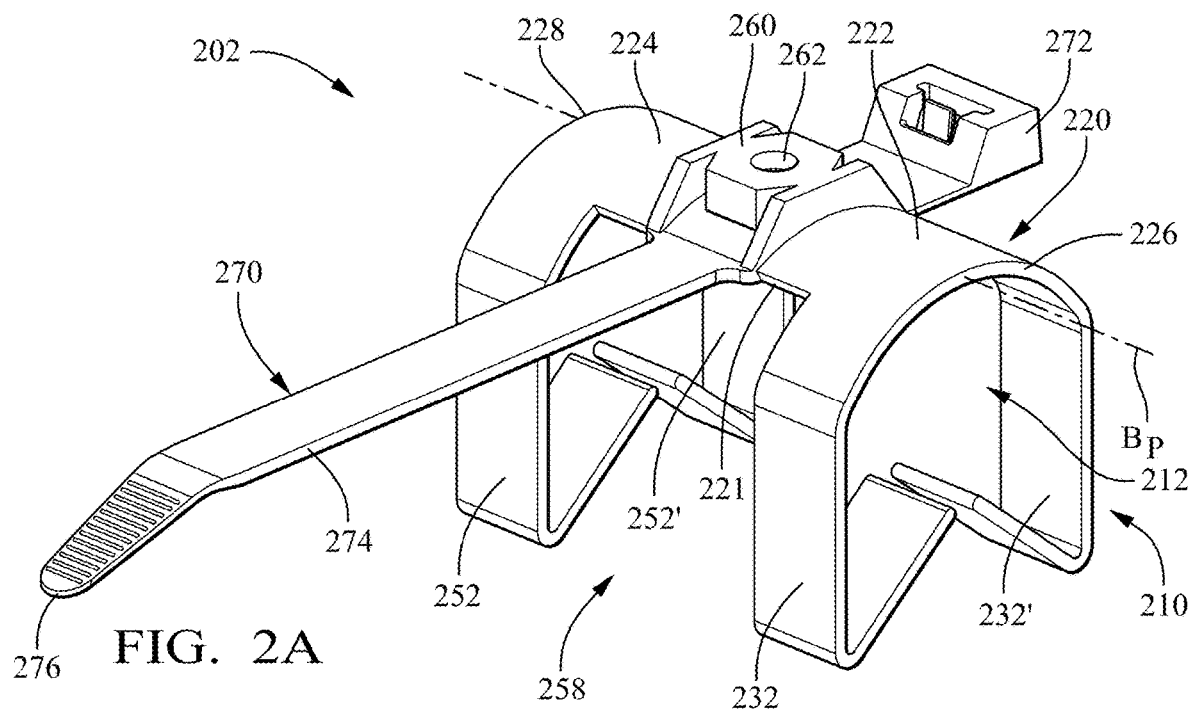
FIG. 2A is a top perspective view of a cradle mount fixing.
Figure 2B:
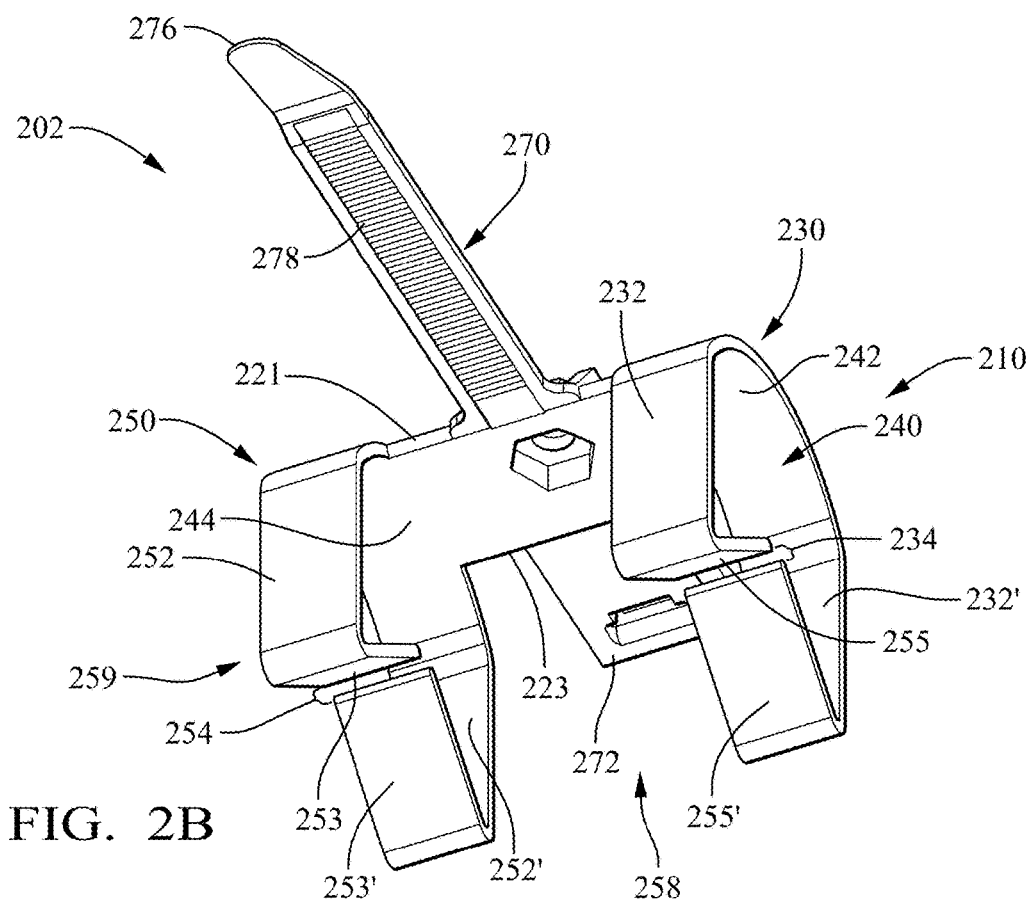
FIG. 2B is a bottom perspective view of the cradle mount fixing of FIG. 2A.
Figure 3A:
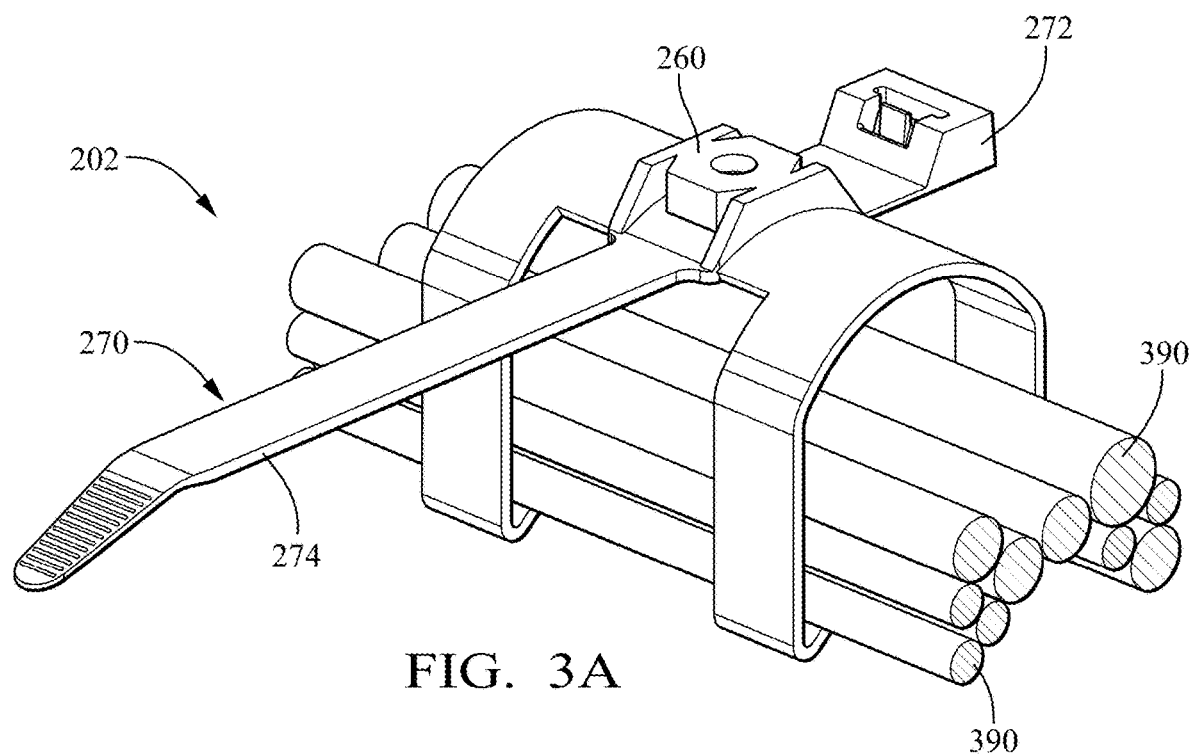
FIG. 3A is a top perspective view of the cradle mount fixing of FIG. 2A, holding unbundled component(s).
Figure 3B:
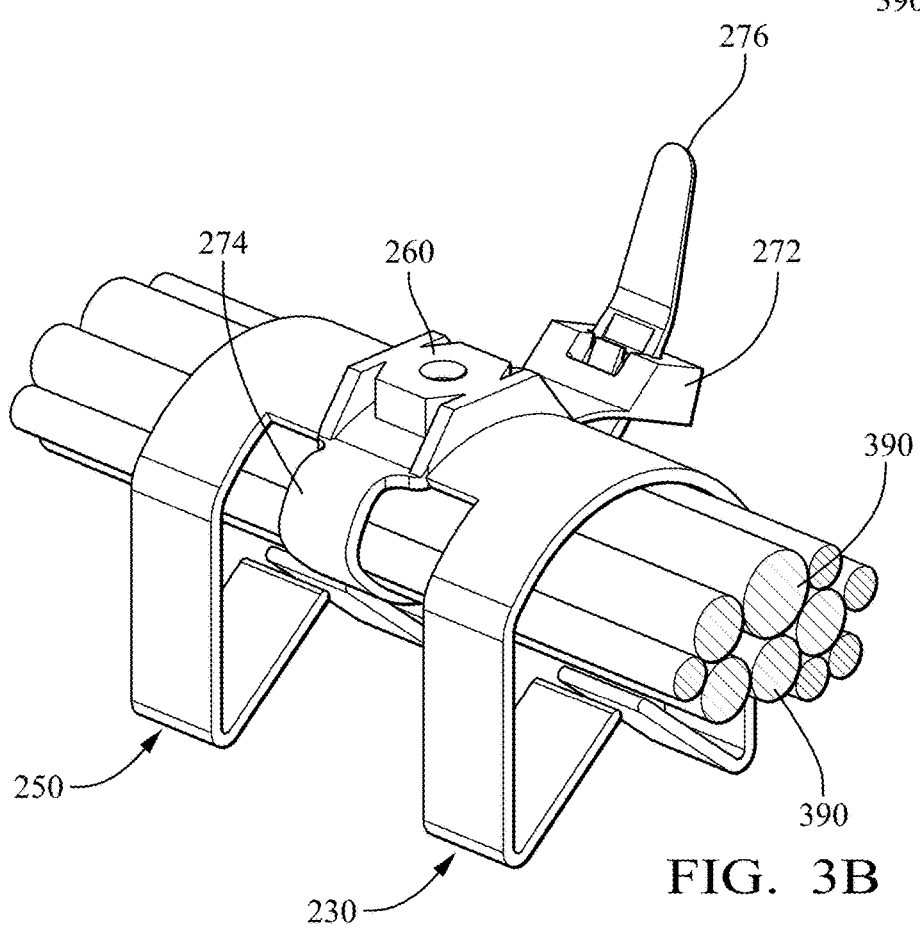
FIG. 3B is a top perspective view of the cradle mount fixing of FIG. 3A, illustrating the component(s) as bundled by the cable tie portion.
Figure 3C:
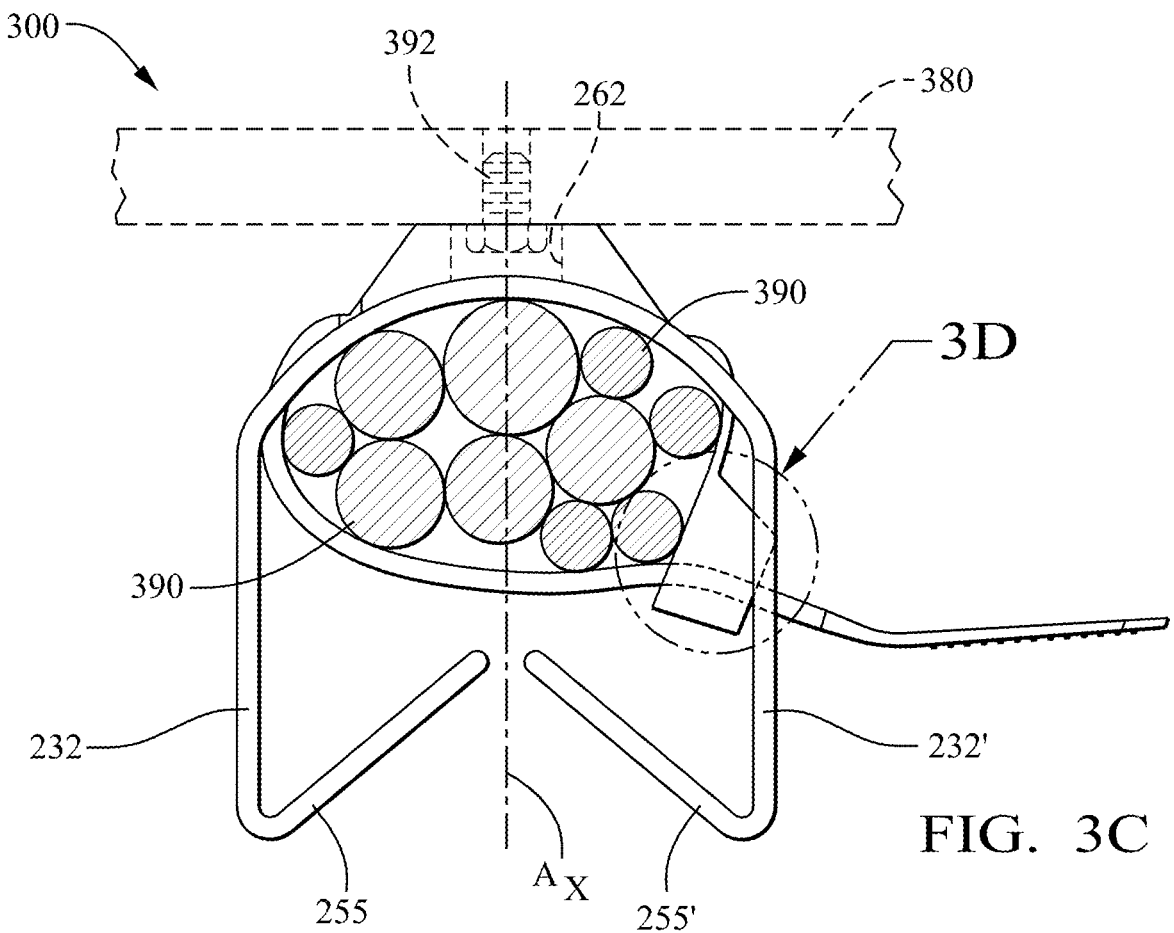
FIG. 3C is a side view of the cradle mount fixing of FIG. 3B, including a workpiece.
Figure 3D:
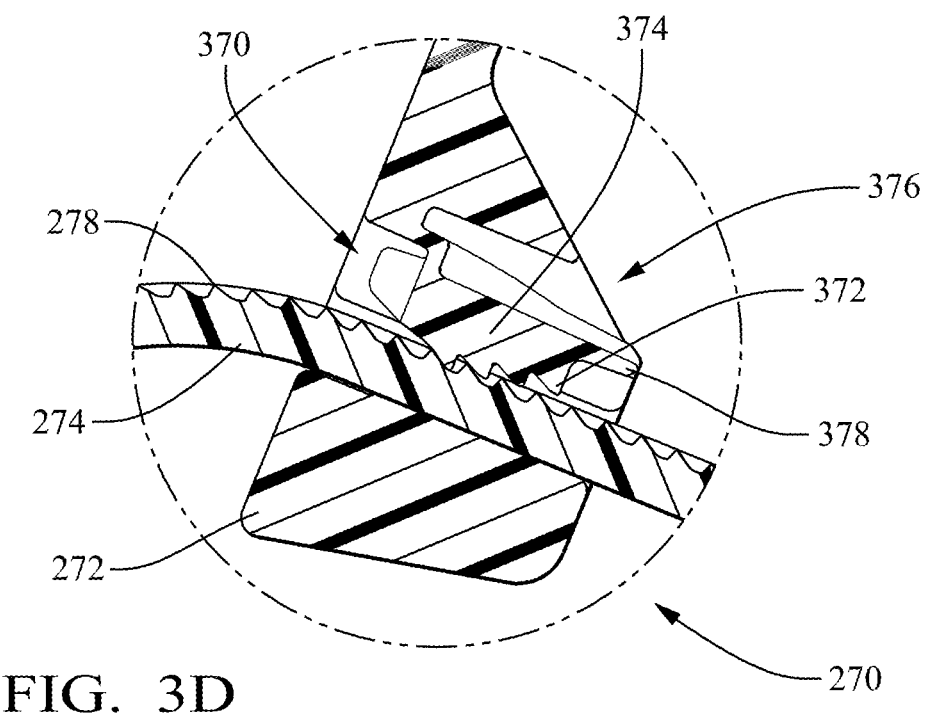
FIG. 3D is an enlarged, cross-sectional view of the head of the cable tie portion illustrated in FIG. 3C, enlarged for magnification purposes.

Referring now to FIGS. 2A, 2B, 3A, 3B, 3C, and 3D, illustrated is a cradle mount fixing 202. FIG. 2A is a top perspective view of a cradle mount fixing and FIG. 2B is a bottom perspective view of the cradle mount fixing of FIG. 2A. FIG. 3A is a top perspective view of the cradle mount fixing of FIG. 2A, FIG. 3B is a top perspective view of the cradle mount fixing of FIG. 3A, FIG. 3C is a side view of the cradle mount fixing of FIG. 3B, and FIG. 3D is an enlarged, cross-sectional view of a head of a cable tie portion illustrated in FIG. 3C. The cradle mount fixing 202 is similar to the cradle mount fixing 102 (fixing 102) illustrated in FIG. 1 and described above, except as detailed below. Thus, the fixing 202 includes a cradle section 210, a body section 220, a first stand-off member 222, a second stand-off member 224, a first cradle portion 230, a first cradle arm 232, a first cradle arm 232', a first cradle 240, a second cradle portion 250, a second cradle arm 252, a second cradle arm 252', a second cradle 259, a mounting section 260, a connector 262, and a cable tie portion 270. The fixing 202 may be utilized in a system (e.g., system 100) that includes components (e.g., component(s) 190) and a workpiece (e.g., workpiece 180). For example, FIG. 3C (described in detail below) illustrates a system 300 that includes the fixing 202, component(s) 390, and a workpiece 380.

The fixing 202 may include a mounting section 260, which is configured for attachment to the workpiece 380 at a desired location. In this way, the fixing 202 is configured for attachment to the workpiece 380 at the desired location via the mounting section 260. The mounting section 260 may be connected to the cradle section 210. The mounting section 260 may be spaced apart from a first end 226 of the body section 220 and a second end 228 of the body section 220. The mounting section 260 may include a connector 262 that is configured to attach the mounting section 260 to the workpiece 380. The connector 262 may be threaded and configured to receive a fastener. The connector 262 illustrated in FIG. 2B includes a recessed nesting feature that is configured to secure a fastener 392 (e.g., threaded nut, bolt head) from turning relative to the fixing 202, if fastening from outside of the fixing 202 is desired. In implementations, the nesting feature may be hexagonal-shaped, square-shaped, or another geometric shape, and may be configured to prevent turning of the fastener when tightening an opposite end of the threaded fastener. A nesting feature may include a counter bore (e.g., a circular counter bore) with a diameter large enough to receive a socket of a socket wrench.

The body section 220 of the fixing 202 is configured to mount on the workpiece 380 via the mounting section 260. The first end 226 of the body section 220 is opposite the second end 228 of the body section 220 and defines a length therebetween. The length of the body section 220 defines a body plane ($B_P$), which is illustrated in FIG. 2A. The body plane ($B_P$) may be orthogonal to a center axis (e.g., center axis ($A_x$) in FIG. 3C) of the fixing 202. The body section 220 may include at least one stand-off member (e.g., first stand-off member 222, second stand-off member 224), which is configured to space the cradle portions (e.g., first cradle portion 230, second cradle portion 250) apart from one another, apart from the mounting section 260, and/or apart from a cable tie portion 270.

The cradle mount fixing 202 includes a cable tie portion 270 (e.g., an adjustable band clamp, an integral cable tie). The cable tie portion 270 may include a reusable elongated strap 274 and a releasable pawl in a locking head 272. The cable tie portion 270 may extend from and/or attach to the body section 220. The cable tie portion 270 may be integrally formed with the cradle section 210. The cable tie portion 270 is utilized to attach (e.g., "cinch down") component(s) 390 to the fixing 202 and is configured to wrap around and secure the component(s) 390 (e.g., wrap around and secure the component(s) 390 in a channel 212 that is defined in the cradle section 210) to the body section 220.

In aspects, the cable tie portion 270 includes a head end and a tail end. The head end includes the locking head 272 and the tail end includes the elongated strap 274. In such a configuration, the elongated strap 274 may be configured for insertion through the locking head 272 to form a loop (e.g., a loop around component(s)). The elongated strap 274 may extend from the locking head 272. In other aspects (e.g., as illustrated in FIGS. 2A-3D), the elongated strap 274 may be spaced apart from the locking head 272. For example, in the fixing 202, the elongated strap 274 extends from a first side 221 of the body section 220 and the locking head 272 extends from a second side 223 of the body section 220. In the implementation illustrated in FIGS. 2A and 3A, the locking head 272 and/or the elongated strap 274 extend from the respective sides of the body section 220 orthogonally to the center axis (e.g., center axis ($A_x$) in FIG. 3C) of the fixing. In other implementations, the locking head 272 and/or the elongated strap 274 may extend from the respective sides of the body section 220 at an angle (e.g., curved at a ninety-degree (90°) angle).

The elongated strap 274 defines a length, for example between the first side 221 of the body section 220 and a tip 276 of the elongated strap 274, as illustrated in FIGS. 2A and 2B. The elongated strap 274 may include a plurality of strap serrations 278 that are defined on at least one lengthwise side of the elongated strap 274. For example, the plurality of strap serrations 278 are illustrated in FIG. 2B as disposed on a bottom side of the elongated strap 274. In aspects, the strap serrations 278 may be located on one of a top side of the elongated strap 274, the bottom side of the elongated strap 274, or both of the top and bottom sides of the elongated strap 274. The strap serrations 278 are configured to engage a pawl mechanism 372 (illustrated in FIG. 3D), which is located within the locking head 272.

The pawl mechanism 372 of the locking head 272 is configured for engaging the strap serrations 278 of the elongated strap 274, thereby retaining the elongated strap 274 relative to the locking head 272. The plurality of strap serrations 278 on the elongated strap 274 enable a variable portion of the elongated strap 274 to be inserted through the locking head 272, which provides an installer with the ability to vary the length of the cable tie portion 270. In this way, the cable tie portion 270 may be length adjustable. The locking head 272 may include a slot 370 that extends through the locking head 272. The slot 370 is configured to receive the elongated strap 274. The locking head 272 has a top side and a bottom side, with the slot 370 defined therebetween.

The pawl mechanism 372 may include a pawl 374 hingedly disposed within the slot 370. The pawl 374 includes at least one pawl tooth (e.g., pawl teeth 376) that is configured to engage at least one of the strap serrations 278 on the elongated strap 274 when the elongated strap 274 is disposed within the slot 370. The pawl mechanism 372 may be disposed within the slot 370 such that when the elongated strap 274 is disposed within the slot 370, the pawl mechanism 372 engages the elongated strap 274 to allow unidirectional movement of the elongated strap 274 through the slot 370 in a first direction and resist movement of the elongated strap 274 in an opposite direction.

The locking head 272 may include a release feature 378 (e.g., unlocking tab, unlocking lever) that is configured to permit the pawl mechanism 372 to be released from engagement with the strap serrations 278 of the elongated strap 274, thereby enabling the cable tie portion 270 to be removed from securing the component(s) 390. The release feature 378 may be configured to enable an operator to digitally manipulate (e.g., utilizing a finger of the operator, utilizing a tool) the release feature 378 to disengage the pawl teeth 376 on the pawl 374 from engagement with the strap serrations 278. Disengagement of the pawl teeth 376 from the strap serrations 278 permits the elongated strap 274 to be withdrawn from the locking head 272 and the cable tie portion 270 to be removed from securing the component(s) 390.

The cradle section 210 of the cradle mount fixing 202 defines a channel 212 that is configured for receiving the component(s) 390. For example, the cradle section 210 may include at least one cradle portion (e.g., first cradle portion 230, second cradle portion 250), which defines a cradle (e.g., first cradle 240, second cradle 259). The cradle is configured to temporarily hold and/or support (e.g., by cradling) the component(s) 390 at a desired mounting location (e.g., on the workpiece 380) while the installer is routing the component(s) 390 along a routing path. For example, FIG. 3A illustrates the cradles (e.g., first cradle 240, second cradle 259) before the application of the cable tie portion 270 to attach the component(s) 390 in the channel (e.g., cradle). In this configuration, the cradles (e.g., first cradle 240, second cradle 259) loosely (e.g., without utilizing the cable tie portion 270) hold the component(s) 390 in place while they are being strung. Once the component(s) 390 are routed, the installer may then bundle the component(s) 390 together into a bundle utilizing the cable tie portion 270, as illustrated in FIG. 3B-3D. In this way, the installer does not need to use temporary strapping material (e.g., cable tie, plastic band, flexible band, metal band, string, twine, wire) to create temporary bundles of the component(s) 190 during routing. Instead, the installer can route all of the component(s) 190 and then apply the cable tie portion 270 to create the bundle(s). Doing so avoids the need for the installer to, for every new component that is added to a string, remove temporary strapping material (e.g., by cutting a disposable cable tie) and add new strapping material (e.g., add a new cable tie). This contrasts with some prior systems where for every new component that was added to a string, an existing bundle would need to be held in place while existing cable ties were cut and new cable ties were re-added. Loosely holding the component(s) 390 in place while they are being strung decreases the time and labor involved in running component(s) 390 during an installation process.

A cradle portion (e.g., first cradle portion 230, second cradle portion 250) may include a support base (e.g., support base 242, support base 244) that is configured to support the component(s) 390 held by the cradle portion. In aspects, the support base (e.g., support base 242, support base 244) is an inwardly facing (e.g., cradle facing) side of the body section 220. In one example, the support base (e.g., support base 242, support base 244) may support the component(s) 390 before the cable tie portion 270 is formed into a loop around the component(s) 390, as illustrated in FIG. 3C. In another example, the support base (e.g., support base 242, support base 244) may support the component(s) 390 after the cable tie portion 270 is formed into a loop around the component(s) 390, as illustrated in FIG. 3C. In a further example, the support base may at least partially support the component(s) 390 when the fixing (e.g., fixing 402 (illustrated in FIG. 4B)) is in a side-loading configuration.

A cradle portion (e.g., first cradle portion 230, second cradle portion 250) may include a pair of cradle arms. For example, the first cradle portion 230 may include a pair of first cradle arms (e.g., first cradle arm 232, first cradle arm 232') and the second cradle portion 250 may include a pair of second cradle arms (e.g., second cradle arm 252, second cradle arm 252'). The pairs of cradle arms may respectively define the cradles therebetween. For example, the pair of first cradle arms (e.g., first cradle arm 232, first cradle arm 232') may define the first cradle 240 therebetween and the pair of second cradle arms (e.g., second cradle arm 252, second cradle arm 252') may define the second cradle 259 therebetween. The cradle arm(s) may extend from the body section 220. For example, the first cradle arms (e.g., first cradle arm 232, first cradle arm 232') may extend from the first stand-off member 222 of the body section 220 and the second cradle arms (e.g., second cradle arm 252, second cradle arm 252') may extend from the second stand-off member 224 of the body section 220.

The cradle arms (e.g., first cradle arm 232, first cradle arm 232', second cradle arm 252, second cradle arm 252') include proximal ends opposite distal ends. The proximal ends may connect to and extend from the body section 220 in a downward direction, away from the body plane ($B_P$) of the body section 220. In aspects, one or more of the cradle arm(s) (e.g., first cradle arm 232, first cradle arm 232', second cradle arm 252, second cradle arm 252') may be curved.

One or more of the cradle arms (e.g., first cradle arm 232, first cradle arm 232', second cradle arm 252, second cradle arm 252') may include at least one inwardly extending retainer tab (e.g., retainer tab 253, retainer tab 253', retainer tab 255, retainer tab 255'). The retainer tabs are configured for retaining the component(s) 390 in the channel (e.g., first cradle 240, second cradle 259). For example, first retainer tabs (e.g., retainer tab 253, retainer tab 253') extending from the distal ends of the cradle arms of the pair of first cradle arms (e.g., first cradle arm 232, first cradle arm 232') may be configured for retaining the component(s) 390 in the first cradle 240, as illustrated in FIG. 3A, and second retainer tabs (e.g., retainer tab 255, retainer tab 255') extending from the distal ends of the cradle arms of the pair of second cradle arms (e.g., second cradle arm 252, second cradle arm 252') may be configured for retaining the component(s) 390 in the second cradle 259, as illustrated in FIG. 3A. The retainer tabs and/or the cradle arms may be flexible. In aspects, a distal end of a cradle arm defines the at least one inwardly extending retainer tab. The retainer tabs of a pair of cradle arms may be spaced apart to define a gap therebetween. For example, the retainer tab 255 and the retainer tab 255' of the first cradle portion 230 may be spaced apart to define a first gap 234 therebetween and/or the retainer tab 253 and the retainer tab 253' of the second cradle portion 250 may be spaced apart to define a second gap 254 therebetween. The first cradle arms, the second cradle arms, the first retainer tabs, and/or the second retainer tabs may be configured to flex to permit the component(s) 390 to be passed through at least one of the first gap 234 or the second gap 254 and into the channel 212. The gap (e.g., first gap 234, second gap 254) may function as a one-way valve that holds the component(s) 390 within the channel 212, for example, against gravity forces. The fixing 202 may be configured to permit the removal of one or more component(s) 390 from the channel 212 through the gap (e.g., first gap 234, second gap 254) by the installer's application of a manual force to at least one of the cradle arms and/or the retainer tabs to widen the gap and permit the component(s) 390 to be passed through the gap and out of the channel 212. The gap (e.g., first gap 234, second gap 254) may vary in dimension. The first cradle arms and the second cradle arms may be asymmetrical. The pairs of retainer tabs and/or the cradle arms may be asymmetrical, and gaps formed by the asymmetrical pairs may be offset and/or not aligned with the other gaps. In this way, the temporary retention of different size bundles (e.g., small diameter wires that are individually inserted into the cradle) may be accommodated.

A cable tie slot 258 may be defined between the first cradle arms (e.g., first cradle arm 232, first cradle arm 232') and the second cradle arms (e.g., second cradle arm 252, second cradle arm 252'). The cable tie slot 258 is configured for receiving the cable tie portion 270 therein for fastening down one or more component(s) 390 to the support base (e.g., support base 242, support base 244) of the fixing 202. The component(s) 390 may be secured, in a cradle (e.g., first cradle 240, second cradle 259), to the cradle portion (e.g., first cradle portion 230, second cradle portion 250) via the cable tie portion 270. In this way, the component(s) 390 may be bundled together into a bundle utilizing the cable tie portion 270.

Figure 4A:
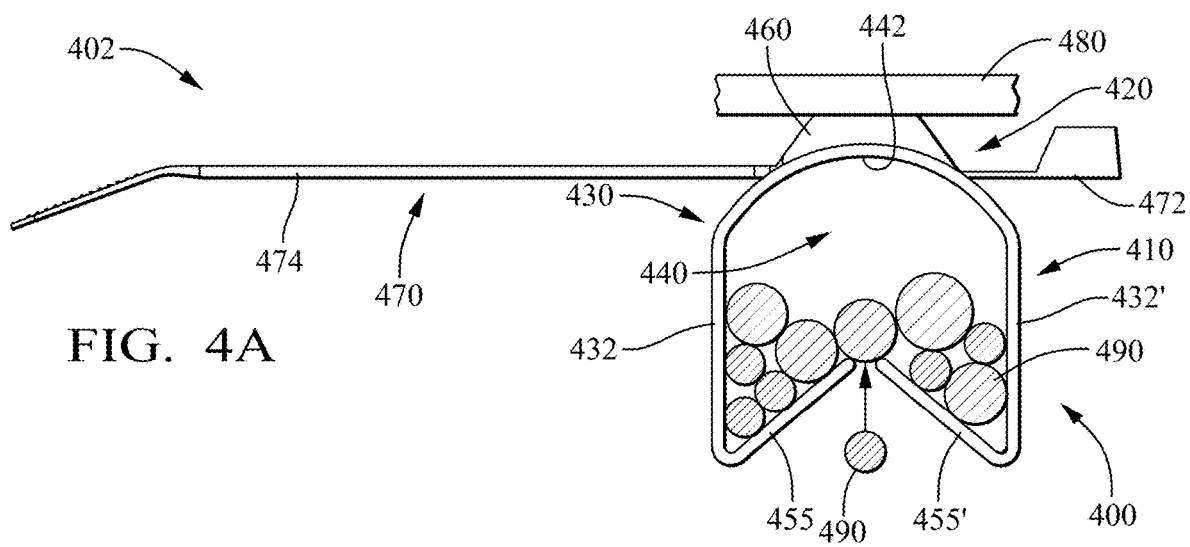
FIG. 4A is a first side view of a cradle mount fixing in a bottom-load configuration.
Figure 4B:
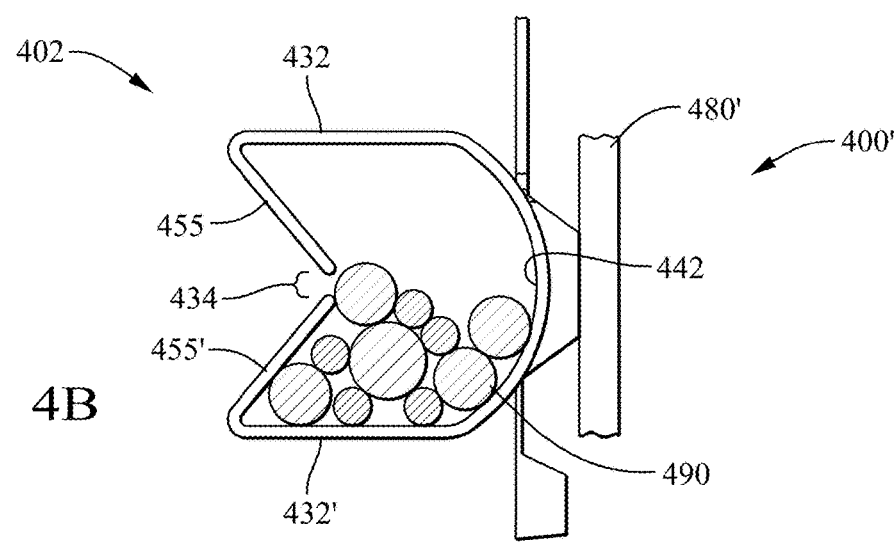
FIG. 4B is a second side view of the cradle mount fixing of FIG. 4A, in a side-load configuration.
Figure 4C:
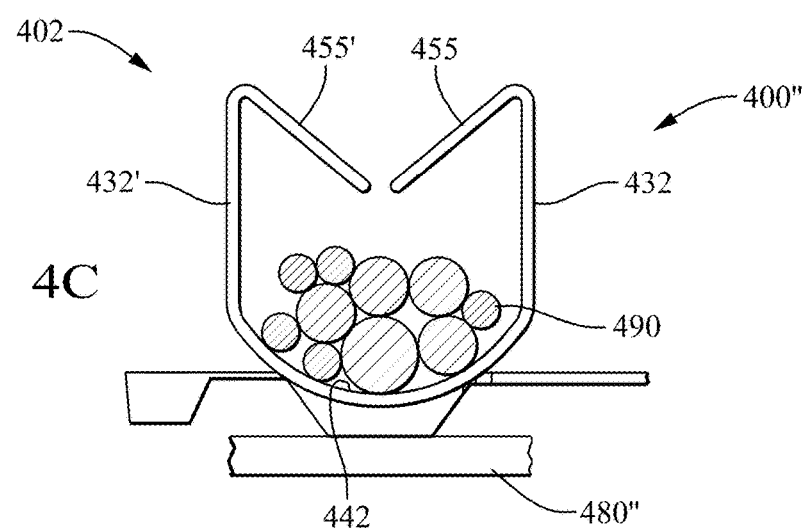
FIG. 4C is a third side view of the cradle mount fixing of FIG. 4A, in a top-load configuration.

Referring now to FIGS. 4A, 4B, and 4C, illustrated are systems (e.g., system 400, system 400', system 400") that include a cradle mount fixing 402 (fixing 402), component(s) 490, and workpieces (e.g., workpiece 480, workpiece 480', workpiece 480"). The fixing 402 is similar to the cradle mount fixings (e.g., fixing 102, fixing 202) illustrated in FIGS. 1-3D and described above, except as detailed below. Thus, the fixing 402 includes a cradle section 410, a body section 420, a cradle portion 430, cradle arms (e.g., cradle arm 432, cradle arm 432'), a cradle 440, a support base 442, a mounting section 460, a cable tie portion 470, a locking head 472, and an elongated strap 474. Retainer tabs (e.g., retainer tab 455, retainer tab 455') of the cradle portion 430 may be spaced apart to define a gap 434 therebetween. The cradle arm 432, the cradle arm 432', the retainer tab 455, and/or the retainer tab 455' may be configured to flex to permit the component(s) 490 to be passed through the gap 434 and into the channel (e.g., into the cradle 440 (e.g., into the channel defined in the fixing 402)). Likewise, the fixing 402 may be configured to permit the removal of one or more component(s) 490 from the channel through the gap 434 by an installer's application of a manual force to at least one of the cradle arms and/or the retainer tabs to widen the gap 434 and permit the component(s) 490 to be passed through the gap 434 and out of the channel. While some structure in side views illustrated in FIGS. 4A, 4B, and 4C may not be visible, the fixing 402 may be configured like the fixings (e.g., fixing 102, fixing 202) described above, with multiple cradle portions and the like.

The fixing 402 may be configured for ceiling, wall, and/or floor mounting via the mounting section 460 (e.g., via a connector and/or fastener, as described above). The fixing 402 may be positioned in one or more of a bottom-load, side-load, and/or top-load configuration before the fixing 402 is attached to the workpiece (e.g., workpiece 480, workpiece 480', workpiece 480"). FIG. 4A is a first side view of the fixing 402 that illustrates a ceiling-mount use case where the fixing 402 is in a bottom-load configuration. In FIG. 4A, the cradle 440 faces downwards. In this configuration, the cradle 440 is configured to receive component(s) 490 inserted through the gap 434 (illustrated in FIG. 4B) and into the cradle 440. The component(s) 490 may have a diameter greater than the width of the gap 434. When the fixing 402 is installed in the bottom-load configuration, the retainer tabs (e.g., retainer tab 455, retainer tab 455') may limit the downward movement of component(s) 490 placed within a channel 412 to keep the component(s) 490 within the cradle 440. In FIG. 4A, the fixing 402 is illustrated as mounted, via the mounting section 460, to the workpiece 480 (e.g., a ceiling surface). FIG. 4B is a second side view of the fixing 402 that illustrates a wall-mount use case where the fixing 402 is in a side-load configuration. In FIG. 4B, the cradle 440 faces sidewards. In this configuration, the cradle 440 is configured to receive component(s) 490 inserted through the gap 434 and into the cradle 440. The component(s) 490 may have a diameter greater than the width of the gap 434. When the fixing 402 is installed in the side-load configuration, the retainer tabs (e.g., retainer tab 455, retainer tab 455') may limit the lateral movement of component(s) 490 placed within the channel 212 (e.g., cradle 440) to keep the component(s) 490 within the cradle 440. In FIG. 4B, the fixing 402 is illustrated as mounted, via the mounting section 460, to the workpiece 480' (e.g., a wall surface). FIG. 4C is a third side view of the fixing 402 that illustrates a floor-mount use case where the fixing 402 is in a top-load configuration. In FIG. 4C, the cradle 440 faces upwards. In this configuration, the cradle 440 is configured to receive component(s) 490 inserted through the gap 434 and into the cradle 440. The component(s) 490 may have a diameter greater than the width of the gap 434. In FIG. 4C, the fixing 402 is illustrated as mounted, via the mounting section 460, to the workpiece 480" (e.g., a floor surface). The support base 442 may support the component(s) 490 held by the cradle portion 430, for example, before the cable tie portion 470 is formed into a loop around the component(s) 490, as illustrated in FIG. 3C with respect to the fixing 202. Once the component(s) 490 are routed, the installer may then bundle the component(s) 490 together into a bundle utilizing the cable tie portion 470, as illustrated in FIG. 3C and described above.

Manufacture

One or more of the components (e.g., cradle section, body section, mounting section, cable tie portion) of the disclosed fixings may be integrally formed of a suitable material(s) through one or more of an injection-molding process, an additive manufacturing process (e.g., a fused deposition modeling (FDM) process, a three-dimensional (3D) printing process), or another suitable process.

Materials

The components (e.g., cradle section, body section, mounting section, cable tie portion) of the disclosed fixings may be fabricated of any suitable material, including, but not limited to, a metal, a ceramic, a polymer (e.g., a polymeric material), and/or a composite. Suitable polymeric materials may include one or more of polyamide (PA), polypropylene (PP), polyethylene (PE), polyphenylene sulfide (PPS), polyether ether ketone (PEEK), polyaryletherketone (PAEK), ethylene tetrafluoroethylene (ETFE), polyacetal (POM), polybutylene terephthalate (PBT), ultraviolet stabilized polyacetal (POMUV), ASA acrylonitrile styrene acrylate, cross-linked thermoplastics, partially cross-linked thermoplastics, higher-temperature resins, ultraviolet (UV) resistant resins, other thermoplastic materials, and the like, and copolymers, blends, or alloys thereof, as well as fiber reinforced materials. A suitable polymeric material may include one or more additives (e.g., heat stabilizers (e.g., copper iodide), impact modifiers (e.g., polyolefin, urethane, rubber), UV stabilizers (e.g., carbon black, hindered amine light stabilizers (HALS)), flame retardants (e.g., nitrogenbased halogen-free flame retardants, melamine cyanurate, melamine borate, ammonium polyphosphate), colorants, and the like). One or more of the components of the disclosed fixings may be formed of the same material as the other components or of a different material than the other components.

ADDITIONAL EXAMPLES

Some additional examples of cradle mount fixings are as follows:

Example 1. A cradle mount fixing for attaching a component to a workpiece, the cradle mount fixing comprising: a cradle section defining a channel configured for receiving the component, the cradle section comprising: a body section; a first cradle portion, the first cradle portion comprising: a pair of first cradle arms that define a first cradle therebetween, the first cradle arms comprising proximal ends opposite distal ends, the proximal ends of the first cradle arms extending from the body section, the first cradle arms defining inwardly extending first retainer tabs, the first retainer tabs configured for retaining the component in the first cradle; a mounting section configured for attachment to the workpiece to secure the cradle mount fixing to the workpiece, the mounting section connected to the cradle section; and a cable tie portion connected to the cradle section, the cable tie portion configured to wrap around and secure the component in the channel to the body section.

Example 2. The cradle mount fixing of Example 1, wherein the cable tie portion is integrally formed with the cradle section.

Example 3. The cradle mount fixing of Example 1, further comprising: a second cradle portion, the second cradle portion comprising: a pair of second cradle arms that define a second cradle therebetween, the second cradle arms comprising proximal ends opposite distal ends, the proximal ends of the second cradle arms extending from the body section, the second cradle arms defining inwardly extending second retainer tabs, the second retainer tabs configured for retaining the component in the second cradle.

Example 4. The cradle mount fixing of Example 3, wherein the first retainer tabs are spaced apart to define a first gap therebetween, and wherein the second retainer tabs are spaced apart to define a second gap therebetween.

Example 5. The cradle mount fixing of Example 4, wherein the first cradle arms and the second cradle arms are configured to flex to permit the component to be passed through at least one of the first gap or the second gap and into the channel.

Example 6. The cradle mount fixing of Example 3, wherein the distal ends of the first cradle arms define the first retainer tabs and the distal ends of the second cradle arms define the second retainer tabs.

Example 7. The cradle mount fixing of Example 3, wherein the body section comprises: a body first end opposite a body second end; a first stand-off member that extends from the body first end; and a second stand-off member that extends from the body second end, wherein the first cradle portion attaches to the first stand-off member and the second cradle portion attaches to the second stand-off member.

Example 8. The cradle mount fixing of Example 3, wherein the cable tie portion further comprises: a head portion extending from a first side of the cradle section; and a tail portion extending from a second side of the cradle section, and wherein the first cradle portion is located at a first end of the cradle section, the second cradle portion is located at a second end of the cradle section, and the first and second ends are orthogonal to the first and second sides.

Example 9. The cradle mount fixing of Example 3, wherein the first cradle arms are spaced apart from the second cradle arms to define a cable tie slot therebetween, the cable tie slot configured for receiving the cable tie portion therebetween for fastening down one or more components to the fixing.

Example 10. The cradle mount fixing of Example 3, wherein the pair of first cradle arms and the pair of second cradle arms laterally extend from opposing ends of the body section.

Example 11. The cradle mount fixing of Example 3, wherein the body section spaces the first cradle portion apart from the second cradle portion and wherein the first and second cradle portions are oriented parallel to one another.

Example 12. The cradle mount fixing of Example 3, wherein the first cradle and the second cradle define the channel of the cradle section.

Example 13. The cradle mount fixing of Example 3, wherein the first cradle portion is oriented parallel to the second cradle portion.

Example 14. The cradle mount fixing of Example 1, wherein the cable tie portion further comprises: an elongated strap comprising a plurality of serrations; and a locking head comprising: a slot that extends through the locking head, the slot configured to receive the elongated strap; and a pawl hingedly disposed within the slot, the pawl including at least one pawl tooth configured to engage at least one of the serrations on the elongated strap when the elongated strap is disposed within the slot.

Example 15. The cradle mount fixing of Example 1, wherein the cable tie portion further comprises: a head portion extending from a first side of the cradle section; and a tail portion extending from a second side of the cradle section.

Example 16. The cradle mount fixing of Example 1, wherein the mounting section is integrally formed with the cradle section.

Example 17. The cradle mount fixing of Example 1, wherein the mounting section attaches to the cradle section on a surface of the cradle section that is opposite a surface of the cradle section that faces the channel.

Example 18. The cradle mount fixing of Example 1, wherein the mounting section comprises a connector configured for attachment to the workpiece.

Example 19. A cradle mount fixing for attaching a component to a workpiece, the cradle mount fixing comprising: a mounting section configured for attachment to the workpiece to secure the cradle mount fixing to the workpiece; a cradle section connected to the mounting section, the cradle section defining a channel configured for receiving the component, the cradle section comprising: a body section, the body section comprising: a body first end opposite a body second end; a first stand-off member that extends from the body section at the body first end; a second stand-off member that extends from the body section at the body second end; a first cradle portion that extends from the first stand-off member, the first cradle portion comprising: a pair of first cradle arms that define a first cradle therebetween, the first cradle arms comprising proximal ends opposite distal ends, the proximal ends of the first cradle arms extending from the body section, the distal ends of the first cradle arms defining inwardly extending first retainer tabs, the first retainer tabs configured for retaining the component in the first cradle; a second cradle portion that extends from the second stand-off member, the second cradle portion comprising: a pair of second cradle arms that define a second cradle therebetween, the second cradle arms comprising proximal ends opposite distal ends, the proximal ends of the second cradle arms extending from the body section, the distal ends of the second cradle arms defining inwardly extending second retainer tabs, the second retainer tabs configured for retaining the component in the second cradle; and a cable tie portion integrally formed with the cradle section, the cable tie portion configured to wrap around and secure the component in the channel to the body section of the cradle section.

Example 20. The cradle mount fixing of Example 19, wherein the first and second retainer tabs extend in an inward direction towards the body section, and wherein the first and second retainer tabs further extend in a downward direction towards the respective stand-off member.

Alternative Language

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Also, as used herein, a phrase referring to "at least one of" a list of items refers to any combination of those items, including single members. For instance, "at least one of a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c, or any other ordering of a, b, and c). Further, items represented in the accompanying figures and terms discussed herein may be indicative of one or more items or terms, and thus reference may be made interchangeably to single or plural forms of the items and terms in this written description.

CONCLUSION

Although implementations for cradle mount fixings have been described in language specific to certain features and/or methods, the subject of the appended claims is not necessarily limited to the specific features or methods described. Rather, the specific features and methods are disclosed as example implementations for cradle mount fixings.

What is claimed is:

1. A cradle mount fixing for attaching a component to a workpiece, the cradle mount fixing comprising:
    a cradle section defining a channel configured for receiving the component, the cradle section comprising:
        a body section;
        a first cradle portion, the first cradle portion comprising:
            a pair of first cradle arms that define a first cradle therebetween, the first cradle arms comprising proximal ends opposite distal ends, the proximal ends of the first cradle arms extending from the body section, the first cradle arms defining inwardly extending first retainer tabs, the first retainer tabs configured for retaining the component in the first cradle;
    a mounting section configured for attachment to the workpiece to secure the cradle mount fixing to the workpiece, the mounting section connected to the cradle section; and
    a cable tie portion connected to the cradle section, the cable tie portion configured to wrap around and secure the component in the channel to the body section.

2. The cradle mount fixing of claim 1, wherein the cable tie portion is integrally formed with the cradle section.

3. The cradle mount fixing of claim 1, further comprising a second cradle portion, the second cradle portion comprising:
    a pair of second cradle arms that define a second cradle therebetween, the second cradle arms comprising proximal ends opposite distal ends, the proximal ends of the second cradle arms extending from the body section, the second cradle arms defining inwardly extending second retainer tabs, the second retainer tabs configured for retaining the component in the second cradle.

4. The cradle mount fixing of claim 3,
    wherein the first retainer tabs are spaced apart to define a first gap therebetween, and
    wherein the second retainer tabs are spaced apart to define a second gap therebetween.

5. The cradle mount fixing of claim 4, wherein the first cradle arms and the second cradle arms are configured to flex to permit the component to be passed through at least one of the first gap or the second gap and into the channel.

6. The cradle mount fixing of claim 3, wherein the distal ends of the first cradle arms define the first retainer tabs and the distal ends of the second cradle arms define the second retainer tabs.

7. The cradle mount fixing of claim 3, wherein the body section comprises:
    a body first end opposite a body second end;
    a first stand-off member that extends from the body first end; and
    a second stand-off member that extends from the body second end, wherein the first cradle portion attaches to the first stand-off member and the second cradle portion attaches to the second stand-off member.

8. The cradle mount fixing of claim 3,
    wherein the cable tie portion further comprises:
        a head portion extending from a first side of the cradle section; and
        a tail portion extending from a second side of the cradle section, and
    wherein the first cradle portion is located at a first end of the cradle section, the second cradle portion is located at a second end of the cradle section, and the first and second ends are orthogonal to the first and second sides.

9. The cradle mount fixing of claim 3, wherein the first cradle arms are spaced apart from the second cradle arms to define a cable tie slot therebetween, the cable tie slot configured for receiving the cable tie portion therebetween for fastening down one or more components to the fixing.

10. The cradle mount fixing of claim 3, wherein the pair of first cradle arms and the pair of second cradle arms laterally extend from opposing ends of the body section.

11. The cradle mount fixing of claim 3, wherein the body section spaces the first cradle portion apart from the second cradle portion and wherein the first and second cradle portions are oriented parallel to one another.

12. The cradle mount fixing of claim 3, wherein the first cradle and the second cradle define the channel of the cradle section.

13. The cradle mount fixing of claim 3, wherein the first cradle portion is oriented parallel to the second cradle portion.

14. The cradle mount fixing of claim 1, wherein the cable tie portion further comprises:
    an elongated strap comprising a plurality of serrations; and a locking head comprising:
- a slot that extends through the locking head, the slot configured to receive the elongated strap; and
- a pawl hingedly disposed within the slot, the pawl including at least one pawl tooth configured to engage at least one of the serrations on the elongated strap when the elongated strap is disposed within the slot.

15. The cradle mount fixing of claim 1, wherein the cable tie portion further comprises:
- a head portion extending from a first side of the cradle section; and
- a tail portion extending from a second side of the cradle section.

16. The cradle mount fixing of claim 1, wherein the mounting section is integrally formed with the cradle section.

17. The cradle mount fixing of claim 1, wherein the mounting section attaches to the cradle section on a surface of the cradle section that is opposite a surface of the cradle section that faces the channel.

18. The cradle mount fixing of claim 1, wherein the mounting section comprises a connector configured for attachment to the workpiece.

19. A cradle mount fixing for attaching a component to a workpiece, the cradle mount fixing comprising:
- a mounting section configured for attachment to the workpiece to secure the cradle mount fixing to the workpiece;
- a cradle section connected to the mounting section, the cradle section defining a channel configured for receiving the component, the cradle section comprising:
  - a body section, the body section comprising:
    - a body first end opposite a body second end;
    - a first stand-off member that extends from the body section at the body first end;
    - a second stand-off member that extends from the body section at the body second end;
  - a first cradle portion that extends from the first stand-off member, the first cradle portion comprising:
    - a pair of first cradle arms that define a first cradle therebetween, the first cradle arms comprising proximal ends opposite distal ends, the proximal ends of the first cradle arms extending from the body section, the distal ends of the first cradle arms defining inwardly extending first retainer tabs, the first retainer tabs configured for retaining the component in the first cradle;
  - a second cradle portion that extends from the second stand-off member, the second cradle portion comprising:
    - a pair of second cradle arms that define a second cradle therebetween, the second cradle arms comprising proximal ends opposite distal ends, the proximal ends of the second cradle arms extending from the body section, the distal ends of the second cradle arms defining inwardly extending second retainer tabs, the second retainer tabs configured for retaining the component in the second cradle; and
- a cable tie portion integrally formed with the cradle section, the cable tie portion configured to wrap around and secure the component in the channel to the body section of the cradle section.

20. The cradle mount fixing of claim 19,
wherein the first and second retainer tabs extend in an inward direction towards the body section, and
wherein the first and second retainer tabs further extend in a downward direction towards the respective stand-off member.

* * * * *